US012772105B2

(12) United States Patent
Nguyen et al.

(10) Patent No.: US 12,772,105 B2
(45) Date of Patent: Oct. 20, 2026

(54) CONFIGURING RETRANSMISSIONS BASED ON SIDELINK CONGESTION

(71) Applicant: QUALCOMM Incorporated, San Diego, CA (US)

(72) Inventors: Tien Viet Nguyen, Bridgewater, NJ (US); Dan Vassilovski, Del Mar, CA (US); Kapil Gulati, Belle Mead, NJ (US)

( * ) Notice: Subject to any disclaimer, the term of this patent is extended or adjusted under 35 U.S.C. 154(b) by 350 days.

(21) Appl. No.: 18/400,733

(22) Filed: Dec. 29, 2023

(65) Prior Publication Data

US 2025/0220503 A1 Jul. 3, 2025

(51) Int. Cl.

| | |
|---|---|
| ***H04W 28/02*** | (2009.01) |
| ***H04B 17/318*** | (2015.01) |
| ***H04L 1/00*** | (2006.01) |
| ***H04L 5/00*** | (2006.01) |
| *H04W 92/18* | (2009.01) |

(52) U.S. Cl.

CPC ...... *H04W 28/0289* (2013.01); *H04B 17/328* (2023.05); *H04L 1/0003* (2013.01); *H04L 5/0053* (2013.01); *H04W 92/18* (2013.01)

(58) Field of Classification Search

CPC .......................... H04W 28/0289; H04W 92/18; H04B 17/328; H04L 1/0003; H04L 5/0053

See application file for complete search history.

(56) References Cited

U.S. PATENT DOCUMENTS

| | | | | |
|---|---|---|---|---|
| 2017/0201461 | A1* | 7/2017 | Cheng | H04L 43/16 |
| 2018/0234973 | A1* | 8/2018 | Lee | H04W 72/0453 |
| 2020/0205166 | A1* | 6/2020 | Huang | H04W 68/005 |
| 2021/0022139 | A1* | 1/2021 | Shin | H04W 24/08 |
| 2021/0051510 | A1* | 2/2021 | Chae | H04L 5/006 |
| 2021/0105661 | A1* | 4/2021 | Baghel | H04W 28/0236 |
| 2021/0168632 | A1* | 6/2021 | Lee | H04B 17/345 |
| 2021/0168648 | A1* | 6/2021 | Lee | H04B 17/327 |
| 2021/0345180 | A1* | 11/2021 | Peng | H04W 28/22 |
| 2021/0385685 | A1* | 12/2021 | Khoryaev | H04L 1/0003 |
| 2022/0038947 | A1* | 2/2022 | Zhang | H04W 16/14 |
| 2022/0103292 | A1* | 3/2022 | Hwang | H04L 1/0064 |
| 2022/0109527 | A1* | 4/2022 | Hwang | H04L 1/1812 |
| 2023/0247587 | A1* | 8/2023 | Lee | H04W 72/02 370/329 |
| 2024/0007968 | A1* | 1/2024 | Shin | H04W 52/283 |
| 2024/0023145 | A1* | 1/2024 | Wang | H04L 1/1848 |
| 2024/0064564 | A1* | 2/2024 | Blasco Serrano | H04W 28/0289 |

* cited by examiner

*Primary Examiner* — Jael M Ulysse

(57) ABSTRACT

Various aspects of the present disclosure generally relate to wireless communication. In some aspects, a first user equipment (UE) may communicate with a second UE using a sidelink and a retransmission feedback process. The first UE may derive, based at least in part on the communicating, that a sidelink congestion metric satisfies a saturation threshold. The first UE may modify the retransmission feedback process based at least in part on the sidelink congestion metric satisfying the saturation threshold. Numerous other aspects are described.

20 Claims, 12 Drawing Sheets

CONFIGURING RETRANSMISSIONS BASED ON SIDELINK CONGESTION

FIELD OF THE DISCLOSURE

Aspects of the present disclosure generally relate to wireless communication and specifically relate to techniques, apparatuses, and methods for configuring retransmissions based on sidelink congestion.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to a method of wireless communication performed by a first user equipment (UE). The method may include communicating with a second UE using a sidelink and a retransmission feedback process, the first UE being a transmitting UE in the retransmission feedback process. The method may include deriving, based at least in part on the communicating, that a sidelink congestion metric satisfies a saturation threshold. The method may include modifying the retransmission feedback process based at least in part on the sidelink congestion metric satisfying the saturation threshold.

Some aspects described herein relate to a method of wireless communication performed by a second UE. The method may include communicating with a first UE using a sidelink and a retransmission feedback process, the second UE being a receiving UE in the retransmission feedback process. The method may include deriving, based at least in part on the communicating, that a sidelink congestion metric satisfies a saturation threshold. The method may include modifying the retransmission feedback process based at least in part on the sidelink congestion metric satisfying the saturation threshold.

Some aspects described herein relate to an apparatus for wireless communication at a first UE. The apparatus may include one or more memories and one or more processors coupled to the one or more memories. The one or more processors may be configured to cause the first UE to communicate with a second UE using a sidelink and a retransmission feedback process, the first UE being a transmitting UE in the retransmission feedback process. The one or more processors may be configured to cause the first UE to derive, based at least in part on the communicating, that a sidelink congestion metric satisfies a saturation threshold. The one or more processors may be configured to cause the first UE to modify the retransmission feedback process based at least in part on the sidelink congestion metric satisfying the saturation threshold.

Some aspects described herein relate to an apparatus for wireless communication at a second UE. The apparatus may include one or more memories and one or more processors coupled to the one or more memories. The one or more processors may be configured to cause the second UE to communicate with a first UE using a sidelink and a retransmission feedback process, the second UE being a receiving UE in the retransmission feedback process. The one or more processors may be configured to cause the second UE to derive, based at least in part on the communicating, that a sidelink congestion metric satisfies a saturation threshold. The one or more processors may be configured to cause the second UE to modify the retransmission feedback process based at least in part on the sidelink congestion metric satisfying the saturation threshold.

Some aspects described herein relate to a non-transitory computer-readable medium that stores a set of instructions for wireless communication by a first UE. The set of instructions, when executed by one or more processors of the UE, may cause the UE to communicate with a second UE using a sidelink and a retransmission feedback process, the first UE being a transmitting UE in the retransmission feedback process. The set of instructions, when executed by one or more processors of the UE, may cause the UE to derive, based at least in part on the communicating, that a sidelink congestion metric satisfies a saturation threshold. The set of instructions, when executed by one or more processors of the UE, may cause the UE to modify the retransmission feedback process based at least in part on the sidelink congestion metric satisfying the saturation threshold.

Some aspects described herein relate to a non-transitory computer-readable medium that stores a set of instructions for wireless communication by a second UE. The set of instructions, when executed by one or more processors of the UE, may cause the UE to communicate with a first UE using a sidelink and a retransmission feedback process, the second UE being a receiving UE in the retransmission feedback process. The set of instructions, when executed by one or more processors of the UE, may cause the UE to derive, based at least in part on the communicating, that a sidelink congestion metric satisfies a saturation threshold. The set of instructions, when executed by one or more processors of the UE, may cause the UE to modify the retransmission feedback process based at least in part on the sidelink congestion metric satisfying the saturation threshold.

Some aspects described herein relate to an apparatus for wireless communication. The apparatus may include means for communicating with a second UE using a sidelink and a retransmission feedback process, the apparatus being, and/or being included in, a first UE that is a transmitting UE in the retransmission feedback process. The apparatus may include means for deriving, based at least in part on the communicating, that a sidelink congestion metric satisfies a saturation threshold. The apparatus may include means for modifying the retransmission feedback process based at least in part on the sidelink congestion metric satisfying the saturation threshold.

Some aspects described herein relate to an apparatus for wireless communication. The apparatus may include means for communicating with a first UE using a sidelink and a retransmission feedback process, the apparatus being, and/or being included in, a second UE that is a receiving UE in the retransmission feedback process. The apparatus may include means for deriving, based at least in part on the communicating, that a sidelink congestion metric satisfies a saturation threshold. The apparatus may include means for modifying the retransmission feedback process based at least in part on the sidelink congestion metric satisfying the saturation threshold.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
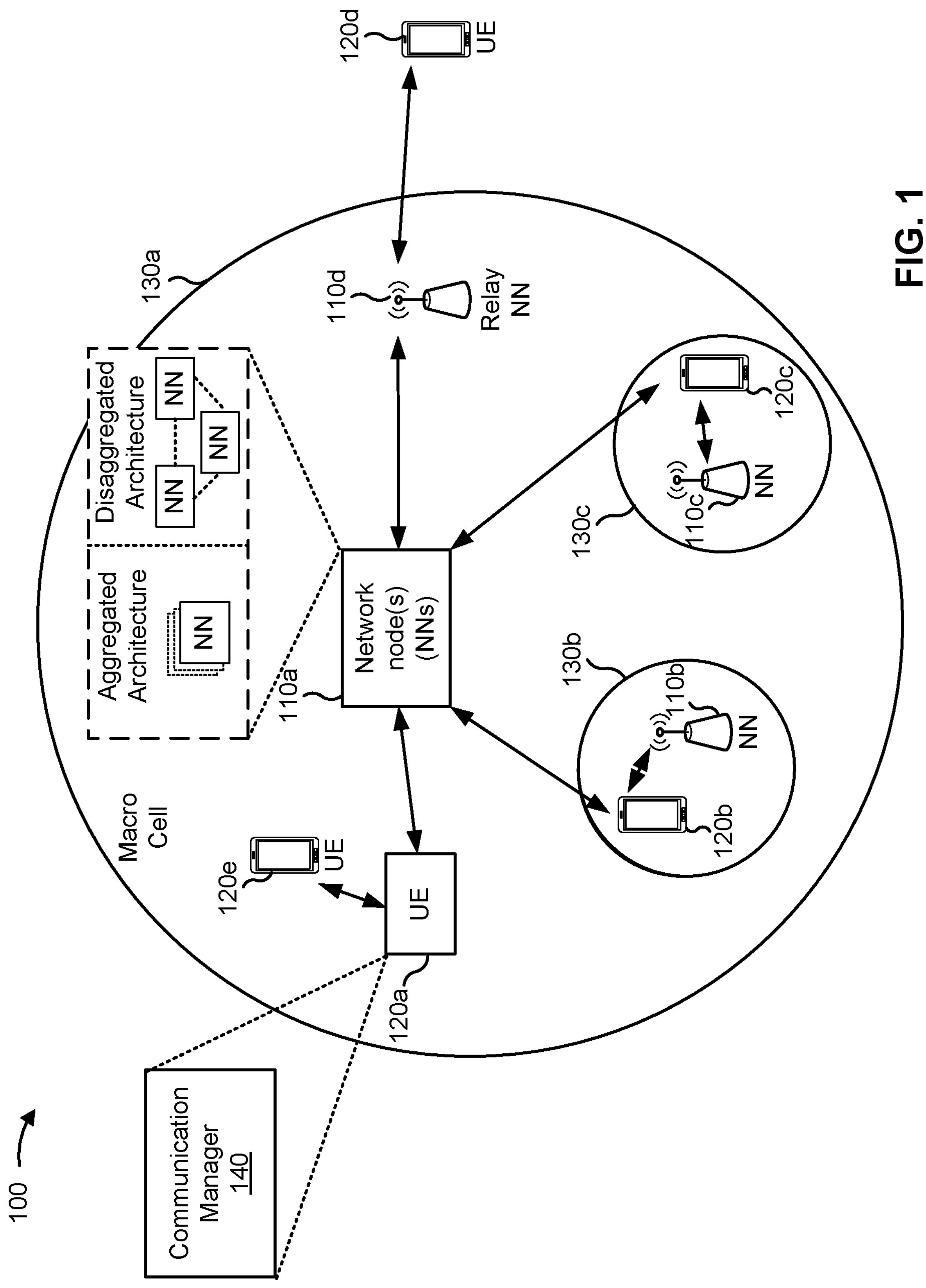
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

"Resource collision" may denote multiple devices accessing and/or using a same air interface resource at a same time. As one example, a first transmitting user equipment (UE) and a second transmitting UE may use a same sidelink air interface resource for respective sidelink transmissions, resulting in one or both transmissions being altered. The occurrence of resource collisions may proportionally increase as a number of UEs operating in a same coverage area increases. Increased resource collisions may also result in an increased number of retransmission requests being transmitted by receiving UE(s) and/or an increased number of retransmissions being transmitted by transmitting UE(s). The increased number of retransmission requests and/or increased number of retransmissions may result in more sidelink air interface resources being used and, consequently, an increased likelihood of more resource collisions. Accordingly, a UE may enable distance-based feedback to reduce a number of feedback transmissions in the wireless network to mitigate the potential increase of resource collisions that are due to the feedback transmissions and/or retransmissions.

A transmitting UE may use different modulation and coding schemes (MCSs) for different transmissions based at least in part on channel conditions and/or channel quality. To illustrate, a resource pool and/or a resource allocation size for sidelink Mode 2 communications may be predetermined and/or preconfigured based at least in part on sensing-based semi-persistent scheduling (SPS). Accordingly, a data packet size may vary depending on an amount of data a transmitting UE may have stored in a buffer. Based at least in part on the resource pool and/or the resource allocation size being preconfigured, the transmitting UE may use a higher MCS for larger data packets to increase an amount of data encoded in a transmission and may use a lower MCS for smaller data packets to increase a reliability of data recovery. While the use of a higher MCS may enable a transmitting device to encode more data in a transmission, the higher MCS may result in the transmission being more sensitive to attenuation and fading in a communication channel relative to a second transmission that uses a lower MCS. Under normal operating conditions that have low data traffic and/or low congestion, a receiving UE may be able to recover from packet reception failures of the higher MCS transmission based at least in part on the feedback and/or retransmission process. However, under high congestion operating conditions, the number of retransmissions may be reduced based at least in part on enabling distance-based feedback and the conditional transmission of negative acknowledgements (NACKs). Reducing the number of retransmissions may result in data packet failure without recovery, reduced data throughput, and/or increased data transfer latency.

Various aspects relate generally to configuring retransmissions based on sidelink congestion. Some aspects more specifically relate to a UE (e.g., a transmitting UE and/or a receiving UE) modifying a retransmission process in a high congestion level operating condition. In some aspects, a first UE may communicate with a second UE using a sidelink and a retransmission feedback process. As one example, the first UE may be a transmitting UE in the retransmission feedback process, such as a hybrid automatic repeat request (HARQ) process. In some aspects, the first UE may derive that a sidelink congestion metric satisfies a saturation threshold, such as by analyzing one or more communications carried by the sidelink. Based at least in part on the sidelink congestion metric satisfying the saturation threshold, the first UE may modify the retransmission feedback process. As one example, the first UE may update a feedback distance and transmit an indication of the updated feedback distance to the second UE. Alternatively, or additionally, the first UE may selectively retransmit a communication to the second UE. For instance, the first UE may calculate signal strength of a feedback transmission from the second UE, and may selectively retransmit the communication based at least in part on the signal strength.

In some aspects, a second UE may communicate with a first UE using a sidelink and a retransmission feedback process, and the second UE may be a receiving UE in the retransmission feedback process. The second UE may derive that a sidelink congestion metric satisfies a saturation threshold, and may modify the retransmission feedback process based at least in part on the sidelink congestion metric satisfying the saturation threshold. As one example, the second UE may modify the retransmission feedback process by increasing a number of requested retransmissions for a high congestion level operating condition and/or may decrease a number of requested retransmissions for a low congestion level operating condition. As another example, the second UE may selectively request a retransmission based at least in part on a signal strength of a communication from the first UE satisfying, and/or failing to satisfy, a power threshold based at least in part on observing that data traffic is at a high congestion level.

Particular aspects of the subject matter described in this disclosure can be implemented to realize one or more of the following potential advantages, such as by increasing retransmissions based at least in part on observing a high congestion level operating condition to mitigate data packet failures. As one example, the transmitting UE may modify a feedback distance based at least in part on an MCS that is used to communicate with the receiving UE, such as by increasing a number of retransmission requests proportionally with an increase in the MCS. Increasing the feedback distance proportionally with an increase in the MCS may result in the receiving UE requesting more retransmissions and may mitigate data packet failures. As another example, a receiving UE may selectively request a retransmission based at least in part on a signal strength metric satisfying a power threshold. In some aspects, the power threshold may be variable such that the power threshold increases as the MCS decreases and/or decreases the MCS increases. Using a power threshold that inversely increases and decreases with the MCS in a high congestion environment may result in the receiving UE requesting more retransmissions for a first communication that uses a first MCS that is higher than a second MCS that is used for a second communication and, consequently, mitigate data packet failures in the high congestion environment.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHZ), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHZ, FR1 is often referred to (interchangeably) as a "Sub-6 GHZ" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUS). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, eMBB, and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE **120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110**) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, a first UE (e.g., a first UE 120) may include a communication manager 140. As described in more detail elsewhere herein, the communication manager 140 may communicate with a second UE using a sidelink and a retransmission feedback process; derive, based at least in part on the communicating, that a sidelink congestion metric satisfies a saturation threshold; and modify the retransmission feedback process based at least in part on the sidelink congestion metric satisfying the saturation threshold.

Alternatively, or additionally, in some aspects, a second UE (e.g., a second UE 120) may include a communication manager 140. As described in more detail elsewhere herein, the communication manager 140 may communicate with a first UE using a sidelink and a retransmission feedback process; derive, based at least in part on the communicating, that a sidelink congestion metric satisfies a saturation threshold; and modify the retransmission feedback process based at least in part on the sidelink congestion metric satisfying the saturation threshold. Additionally, or alternatively, the communication manager 140 may perform one or more other operations described herein.

As indicated above, FIG. 1 is provided as an example. Other examples may differ from what is described with regard to FIG. 1.

Figure 2:
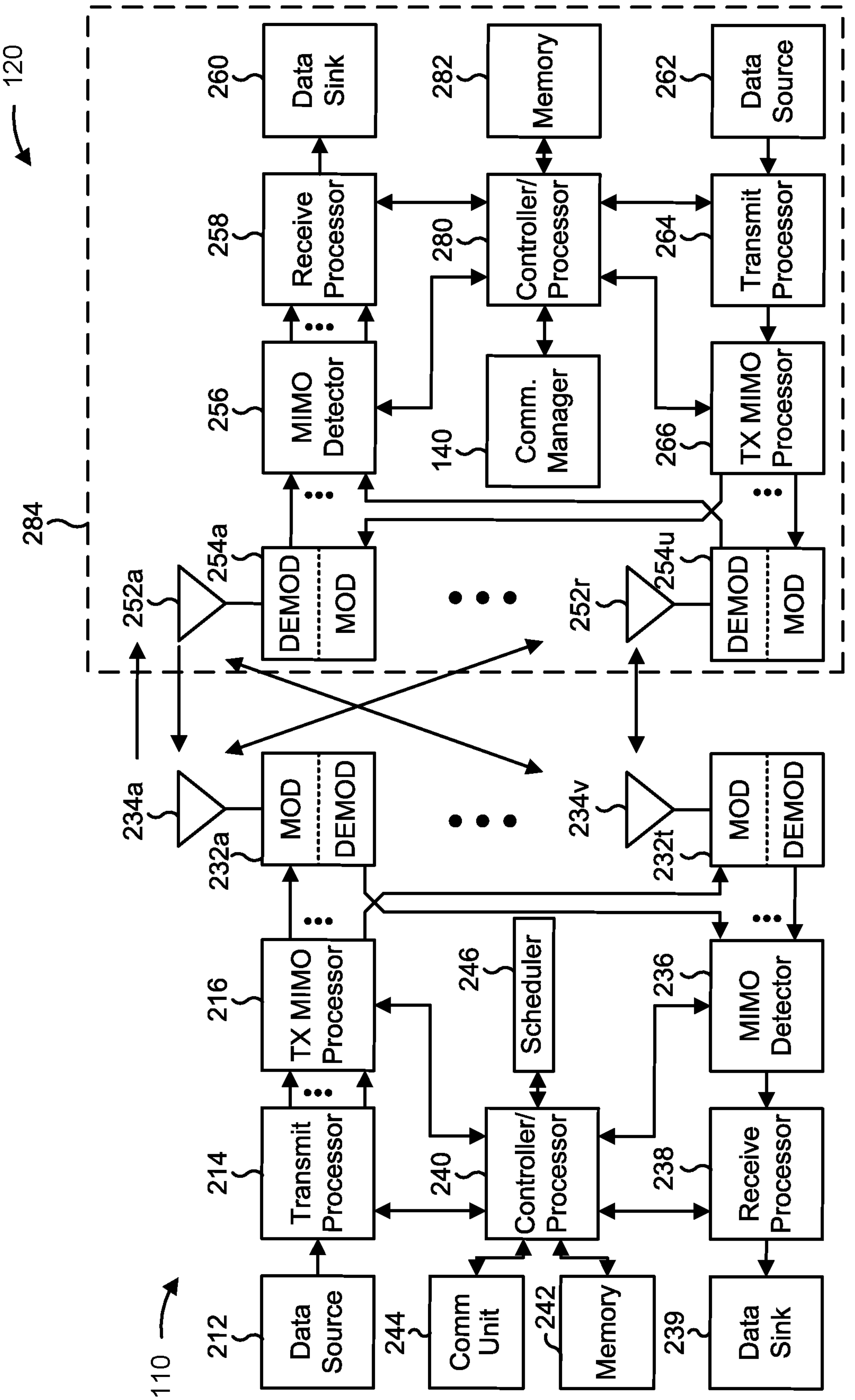
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where $t \geq 1$), a set of antennas 234 (shown as 234*a* through 234*v*, where $v \geq 1$), a MIMO detector 236, a receive processor 238, a data sink 239, a controller/processor 240, a memory 242, a communication unit 244, and/or a scheduler 246, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform SPS or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, May perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
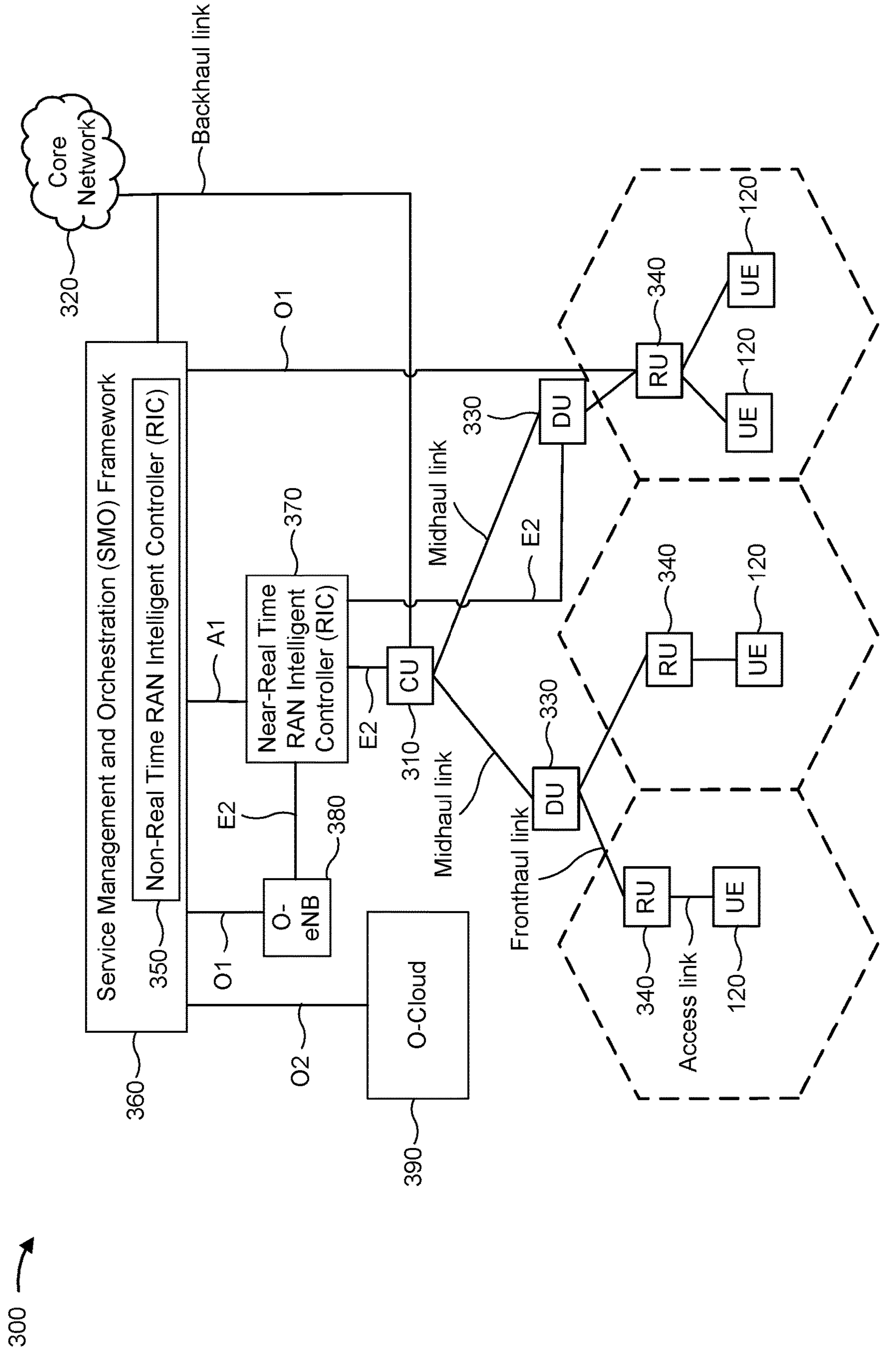
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU-UP units and one or more CU-CP units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with configuring retransmissions for sidelink congestion, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 1000 of FIG. 10, process 1100 of FIG. 11, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 1000 of FIG. 10, process 1100 of FIG. 11, or other processes as described herein. In some examples, executing instructions may include running the instructions, converting the instructions, compiling the instructions, and/or interpreting the instructions, among other examples.

In some aspects, a first UE (e.g., a UE 120) includes means for communicating with a second UE using a sidelink and a retransmission feedback process; means for deriving, based at least in part on the communicating, that a sidelink congestion metric satisfies a saturation threshold; and/or means for modifying the retransmission feedback process based at least in part on the sidelink congestion metric satisfying the saturation threshold. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second UE (e.g., a UE 120) includes means for communicating with a first UE using a sidelink and a retransmission feedback process; means for deriving, based at least in part on the communicating, that a sidelink congestion metric satisfies a saturation threshold; and/or means for modifying the retransmission feedback process based at least in part on the sidelink congestion metric satisfying the saturation threshold. The means for the second UE to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 4:
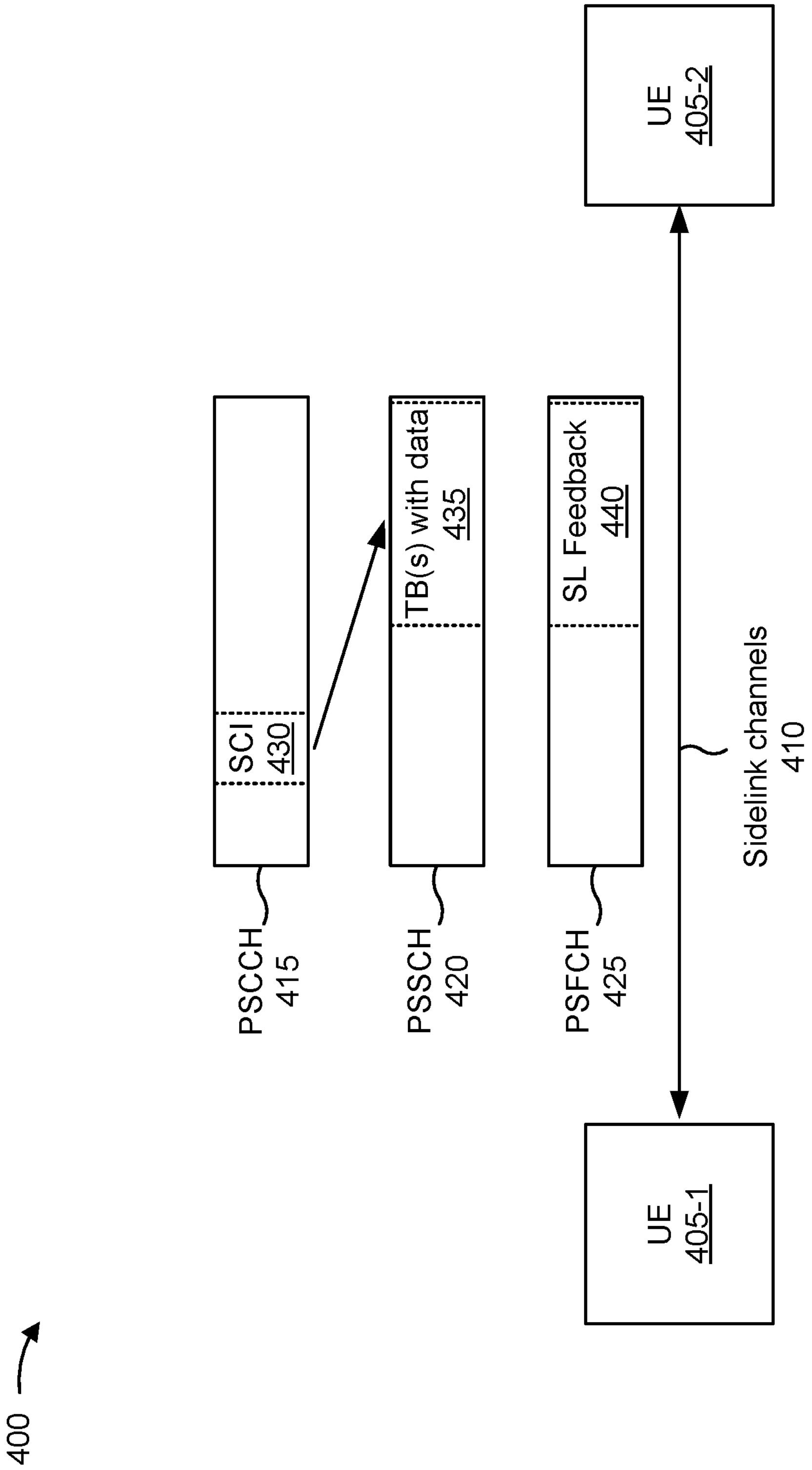
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using GNSS timing.

As further shown in FIG. 4, the one or more sidelink channels 410 may include a PSCCH 415, a PSSCH 420, and/or a PSFCH 425. The PSCCH 415 may be used to communicate control information, similar to a PDCCH and/or a PUCCH used for cellular communications with a network node 110 via an access link or an access channel. The PSSCH 420 may be used to communicate data, similar to a PDSCH and/or a PUSCH used for cellular communications with a network node 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a TB 435 may be carried on the PSSCH 420. The TB 435 may include data. The PSFCH 425 may be used to communicate sidelink feedback 440, such as HARQ feedback (e.g., acknowledgement or negative acknowledgement (ACK/NACK) information), TPC, and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QOS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 420, such as a HARQ process ID, a new data indicator (NDI), a source identifier, a destination identifier, and/or a CSI report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a network node 110 (e.g., a base station, a CU, or a DU). For example, the UE 405 may receive a grant (e.g., in DCI or in an RRC message, such as for configured grants) from the network node 110 (e.g., directly or via one or more network nodes) for sidelink channel access and/or scheduling. In some aspects, a UE 405 may operate using a transmission mode (e.g., Mode 2) where resource selection and/or scheduling is performed by the UE 405 (e.g., rather than a network node 110). In some aspects, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes). "Channel busy ratio" may denote a ratio of a time during which a wireless channel is occupied with a transmission (e.g., busy with a data transmission) and a total time the wireless channel is available.

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or an MCS to be used for the upcoming sidelink transmission. In some aspects, a UE 405 may generate a sidelink grant that indicates one or more parameters for SPS, such as a periodicity of a sidelink transmission. Additionally, or alternatively, the UE 405 may generate a sidelink grant for event-driven scheduling, such as for an on-demand sidelink message.

In some aspects, the resource allocation of sidelink air interface resources may be characterized by, and/or partitioned into, units of sub-channels in the frequency domain. Alternatively, or additionally, resource allocation may be characterized based at least in part on time partitions, such as on a slot basis (e.g., one slot at a time in the time domain). A UE using Mode 2 sidelink access may reserve one or more air interface resources in a current slot and up to two future slots for a sidelink transmission. Resource reservation, such as the UE reserving air interface resources in one or more future slots, may be performed on a periodic basis and/or an aperiodic basis. For example, periodic resource reservation may reserve air interface resource(s) in future periodic slots (e.g., the two future slots), and aperiodic resource reservation may reserve one or more resources in a current slot (e.g., and not future periodic slots). A UE may indicate reservation information in SCI. For instance, for a periodic resource reservation, a UE may signal a duration and/or period of the periodic resource reservation. In some aspects, the UE may signal one of multiple configurable and/or potential values for the period, such as by selecting and/or signaling a value that is within a range of 0 milliseconds (msec) to 1000 msec. Alternatively, or additionally, periodic resource reservation may be enabled and/or disabled. For instance, pre-configuration of the sidelink, a resource pool for the sidelink, and/or a resource window for the sidelink may indicate an enabled state and/or a disabled state for periodic resource reservations, and/or a UE may dynamically indicate an enabled state and/or a disabled state for periodic resource reservations. In some aspects, periodic resource reservations and/or aperiodic resource reservations may be based at least in part on a resource window that includes 32 logical slots.

As indicated above, FIG. 4 is provided as an example. Other examples may differ from what is described with respect to FIG. 4.

Figure 5:
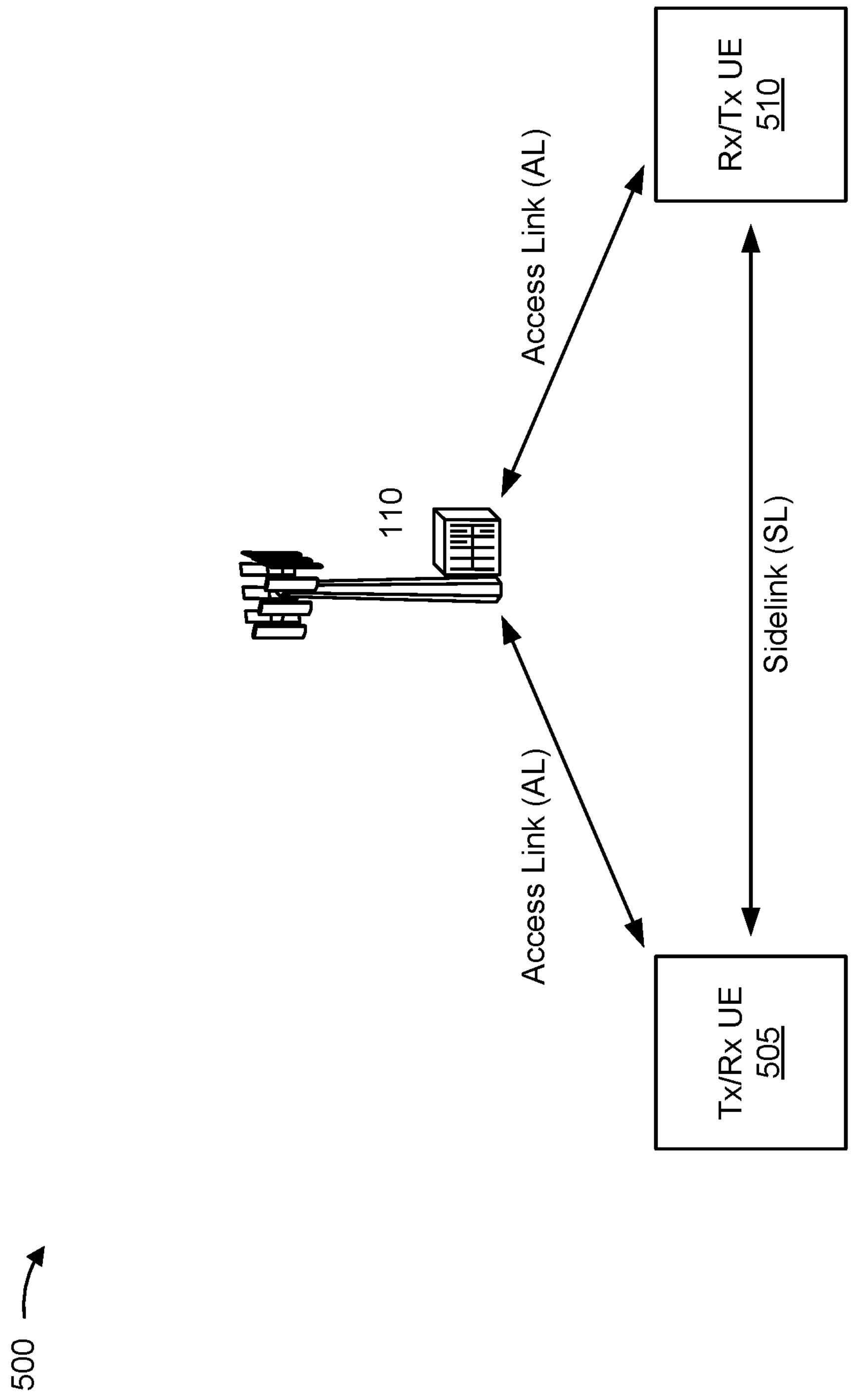
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a network node 110 may communicate with the Tx/Rx UE 505 (e.g., directly or via one or more network nodes), such as via a first access link. Additionally, or alternatively, in some sidelink modes, the network node 110 may communicate with the Rx/Tx UE 510 (e.g., directly or via one or more network nodes), such as via a first access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a network 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 5 is provided as an example. Other examples may differ from what is described with respect to FIG. 5.

Figures 6A, 6B:
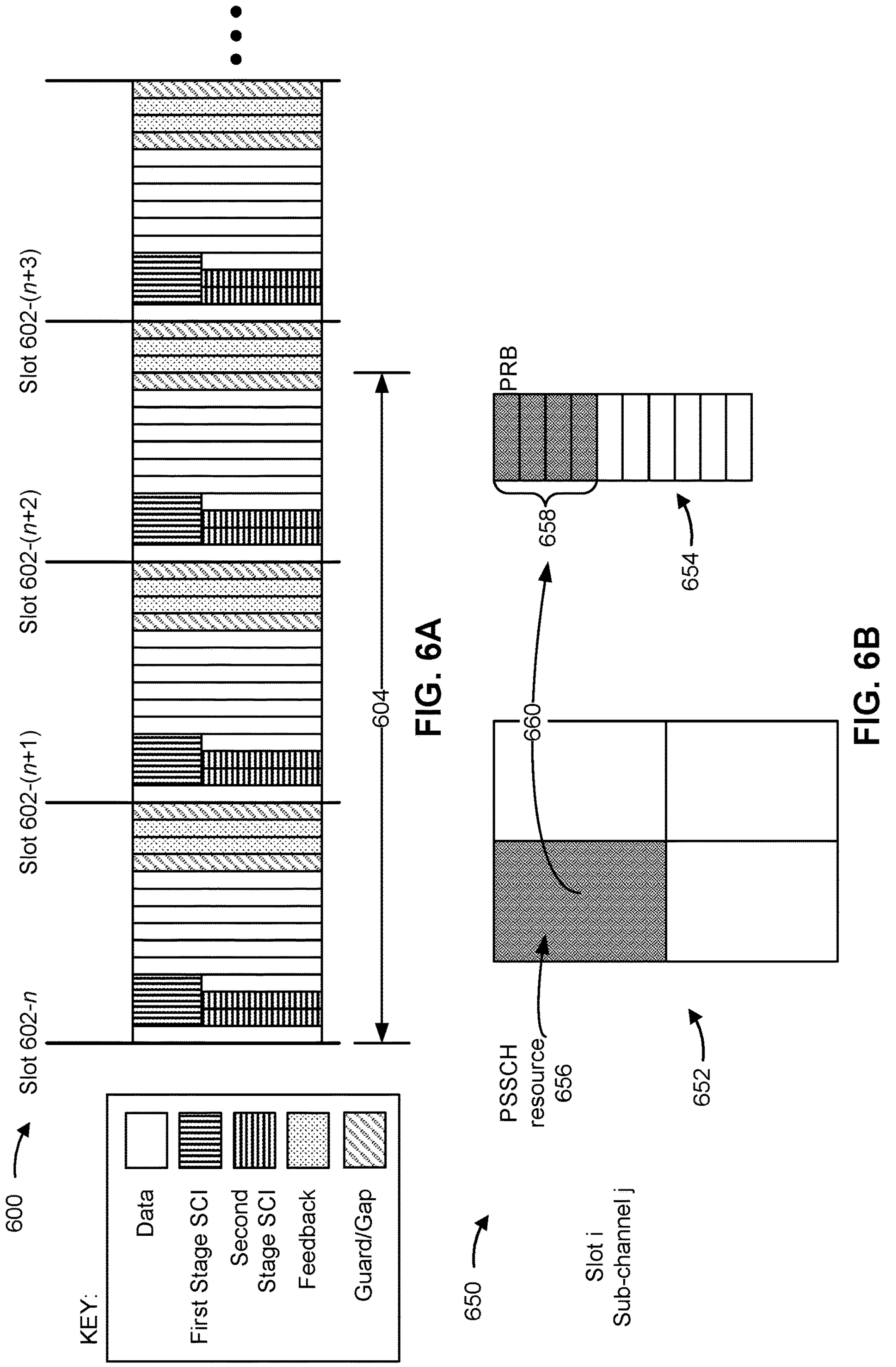
FIGS. 6A and 6B are diagrams illustrating a first example and a second example, respectively, of various aspects of a physical sidelink feedback channel, in accordance with the present disclosure.

FIGS. 6A and 6B are diagrams illustrating a first example 600 and a second example 650, respectively, of various aspects of a PSFCH, in accordance with the present disclosure.

A PSFCH is a sidelink communication channel that one or more UEs may use to transmit and/or receive feedback information that is related to a sidelink communication, such as a HARQ acknowledgement (ACK) and/or a HARQ NACK. The air interface resources used for a PSFCH may be system wide resources, rather than UE-specific resources. "System wide resource" may denote an air interface resource that may be used by multiple UEs, and "UE-specific resource" may denote an air interface resource that is assigned to, and/or may only be used by, a specific UE. In some aspects, a network node (e.g., a network node 110) may indicate a configuration for the PSFCH, such as a periodicity of the PSFCH, a number of physical resource blocks (PRBs) for the PSFCH, and/or a feedback mode. To illustrate, the example 600 includes air interface resources that have been apportioned between data transmissions (shown in solid white), first stage SCI (shown in vertical stripes), second stage DCI (shown in horizontal stripes), and feedback (shown in a dotted pattern). In some aspects, the air interface resources apportioned to feedback may alternatively or additionally be referred to as PSFCH feedback air interface resources (e.g., air interface resources that are assigned to the PSFCH). A horizontal axis of the set of air interface resources represents time, and a vertical axis represents frequency.

In FIG. 6A, the air interface resources have been partitioned into slots (shown as slot 602-*n*, slot 602-(*n*+1), slot 602-(*n*+2), and slot 602-(*n*+3)), and each slot has been partitioned into M symbols (e.g., OFDM symbols), where n and M are integers. In the example 600, M=14. As described above, a network node may configure the PSFCH with a period N, where N is an integer and is shown in FIG. 6A as having a unit of slots. For example, the network node may configure the PSFCH with a period of N=1 slot, N=2 slots, and/or N=4 slots. As shown by reference number 604, the PSFCH is configured a period of N=2 slots such that PSFCH feedback for a data transmission that occurs in slot 602-*n* may occur at a period of N=2 slots after the data transmission (e.g., in slot 602-(*n*+2)). In the example 600, the PSFCH spans three symbols: two symbols that are assigned to PSFCH information (e.g., ACK feedback, NACK feedback, and/or duplicated ACK/NACK feedback) and one symbol that is configured as a guard symbol and/or gap symbol (shown with a diagonal stripe). Alternatively, or additionally, and as shown by FIG. 6A, the PSFCH may be preceded by one guard symbol that may be associated with a transition from a data transmission to a PSFCH transmission.

In some aspects, the network node may configure a number of PRBs in a symbol that are allocated to, and/or may be used for, the PSFCH. As one example, the network node may transmit a bitmap, and each bit may map to a respective PRB. The network node may set a bit to a first value (e.g., "0") to indicate a PRB is not allocated to the PSFCH and/or a second value (e.g., "1") to indicate the PRB is allocated to the PSFCH. Accordingly, the bitmap may indicate a respective state for each PRB (e.g., used for PSFCH or not used for PSFCH) based at least in part on a respective value of each bit.

In some aspects, a structure and/or format of the PSFCH may be based at least in part on a PUCCH Format 0 in which each RB of a symbol carries HARQ feedback information (e.g., ACK feedback and/or NACK feedback) for a single transmission. That is, the PSFCH may use a PSFCH Format 0 that is based at least in part on the PUCCH Format 0, and each RB of a PSFCH symbol may carry HARQ feedback information for a single, respective PSSCH transmission. In some aspects, a second symbol of a PSFCH transmission may repeat information that is carried by a first symbol of the PSFCH transmission. Accordingly, information indicated using the PSFCH Format 0 sequence may be repeated on multiple PSFCH symbols (shown as two by FIG. 6A).

PSFCH may be enabled and/or configured for unicast feedback (e.g., feedback associated with a unicast transmission) and/or groupcast feedback (e.g., feedback associated with a groupcast transmission). Accordingly, a configuration of the PSFCH based at least in part on the PSFCH carrying unicast feedback and/or groupcast feedback. For instance, unicast feedback for a unicast PSSCH transmission may be configured as a single bit that indicates an ACK when set to a first value (e.g., "0") and/or indicates a NACK when set to a second value (e.g., "1"), or vice versa, and a receiving UE in a HARQ process may transmit unicast feedback for both ACK feedback and NACK feedback. Alternatively, or additionally, groupcast feedback for a groupcast PSSCH transmission may have multiple potential groupcast feedback modes, and a receiving UE may be configured to transmit groupcast feedback (e.g., via a single bit) for a groupcast PSSCH transmission using one of multiple groupcast feedback modes. To illustrate, the receiving UE may operate based at least in part on a first groupcast feedback mode (e.g., option 1 groupcast feedback) in which the receiving UE only transmits NACK feedback as the PSFCH feedback information (e.g., via the single bit), and does not transmit ACK feedback. Alternatively, or additionally, the receiving UE may operate based at least in part on a second feedback mode (e.g., option 2 groupcast feedback) in which the receiving UE transmits both ACK feedback and NACK feedback as the PSFCH feedback information. The use of ACK-based PSFCH feedback and/or NACK-based PSFCH feedback may enable a wireless system to perform retransmissions, resulting in the receiving UE being able to recover from packet reception failure.

The example 650 shown by FIG. 6B provides a mapping between a PSSCH resource and a PSFCH resource, and the PSFCH resource may be used to provide feedback that is associated with a transmission carried by the PSSCH resource. Accordingly, the mapping may indicate the PSFCH resource that carries feedback for a PSSCH transmission carried in the PSSCH resource. The example 650 includes multiple resources 652 that may be used for PSSCH and/or transmissions carried by the PSSCH, such as the air interface resources apportioned to data transmission as described with regard to FIG. 6A. The example 650 also includes multiple resources 654 that may be used for PSFCH and/or transmissions carried by the PSFCH, such as the air interface resources apportioned to the PSFCH as described with regard to FIG. 6A. For both sets of resources, a horizontal axis represents time, and a vertical axis represents frequency. In some aspects, for groupcast PSFCH feedback, the number of PSFCH resources may be based at least in part on a number of UEs included in the groupcast. As one example, an operating condition may specify that the number of PSFCH resources is equal to, or greater, than the number of UEs in the groupcast.

A PSSCH resource 656 may be characterized based at least in part on a time partition (e.g., a slot i, where i is an integer), and a frequency partition (e.g., a sub-channel j, where j is an integer). In some aspects, a PSSCH resource 656 (e.g., of the multiple resources 652 that may be used for PSSCH and/or transmissions carried by the PSSCH) may be mapped to one or more PSFCH resources 658 (e.g., of the multiple resources 654 that may be used for PSFCH and/or transmissions carried by the PSFCH) based at least in part on the time partition and the frequency partition. To illustrate, a mapping 660 from the PSSCH resource 656 to the PSFCH resource(s) 658 may be based at least in part on a slot in which the PSSCH resource 656 occurs (e.g., slot i, where i is an integer) and/or the sub-channel in which the PSSCH resource 656 occurs (e.g., sub-channel j, where j is an integer). For example, the mapping 660 may be based at least in part on a time offset that is applied to slot i and/or a frequency offset that is applied to sub-channel j. Alternatively, or additionally, the mapping 660 may be based at least in part on a source identifier (ID) and/or a destination ID, such as a source ID of a PSSCH transmission carried by the PSSCH resource 656, a destination ID of the PSSCH transmission carried by the PSSCH resource(s) 656, a source ID of a PSFCH transmission to be carried by the PSFCH resource(s) 658, and/or a destination ID of the PSFCH transmission to be carried by the PSFCH resource(s) 658.

As indicated above FIGS. 6A and 6B are provided as examples. Other examples may differ from what is described with regard to FIGS. 6A and 6B.

Figure 7:
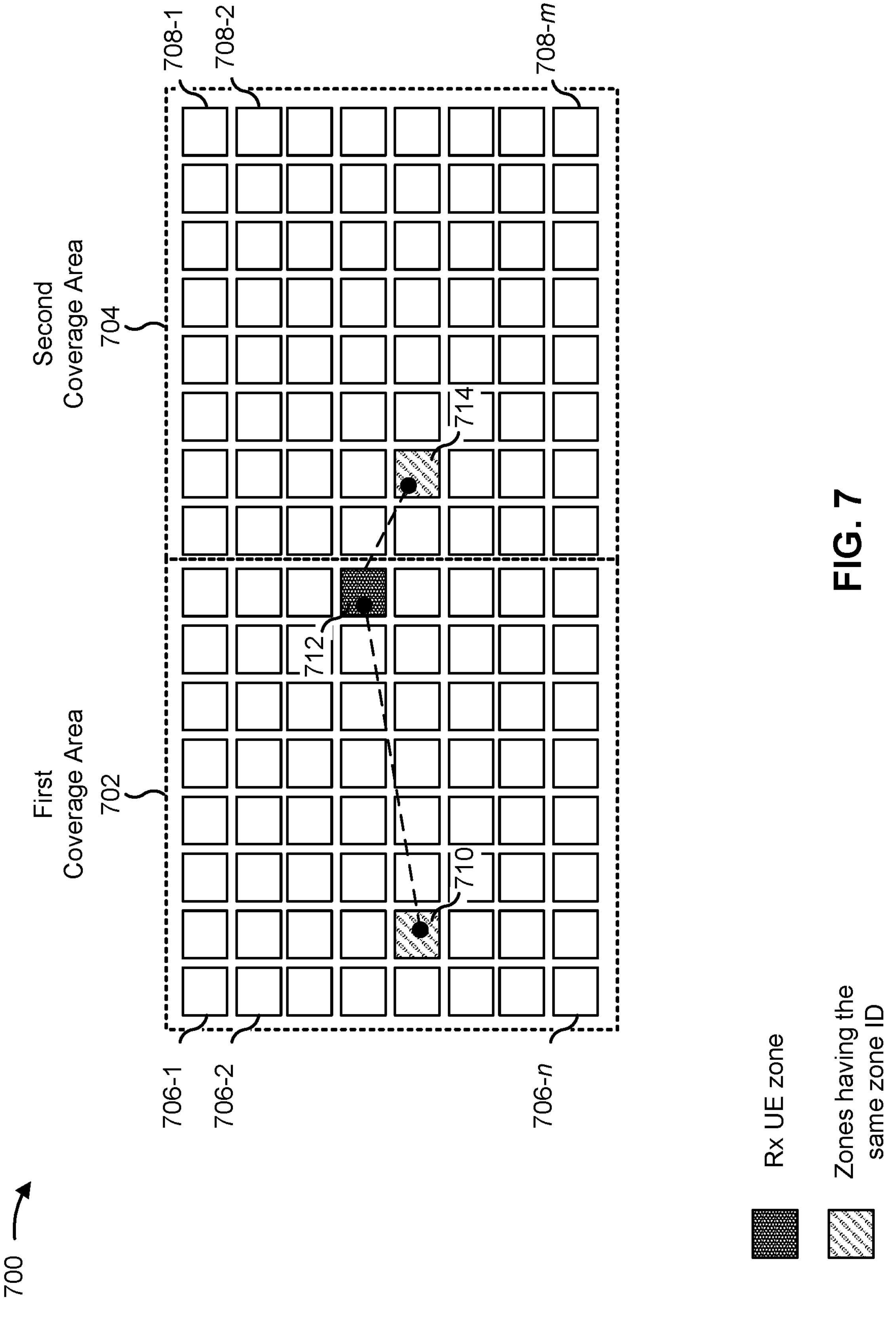
FIG. 7 is a diagram illustrating an example of distance-based feedback, in accordance with the present disclosure.

FIG. 7 is a diagram illustrating an example 700 of distance-based feedback, in accordance with the present disclosure.

"Distance-based feedback" may denote a retransmission process that uses distance and/or location information about a transmitting device and/or a receiving device to modify various communication parameters associated with communications between the transmitting device and the receiving device. To illustrate, the transmitting device may increase a transmission power level of a retransmission (e.g., relative to an original transmission), modify an MCS that is applied to the retransmission, and/or modify an amount of redundancy included in the retransmission to reduce recovery errors, reduce data transfer latencies, and/or increase data throughput. Alternatively, or additionally, the distance-based feedback may modify a retransmission based at least in part on signal quality information (e.g., signal measurement metrics). Distance-based feedback may also be referred to as an adaptive retransmission process that modifies a transmission configuration of a retransmission (e.g., relative to the original transmission) based at least in part on a distance and/or channel quality.

In some aspects, a HARQ process may use distance-based feedback and/or enable distance-based feedback for groupcast feedback. To illustrate, a sidelink HARQ process may enable and/or utilize distance-based feedback for option 1 groupcast feedback (e.g., a receiving UE transmits NACK feedback and does not transmit ACK feedback). As one example, based at least in part on distance-based feedback being enabled and/or using an option 1 groupcast feedback mode, a receiving UE may conditionally transmit NACK feedback based at least in part on the combination of PSSCH decoding failing and being located within communication range (e.g., within a distance threshold) of the transmitting UE.

A transmitting UE may indicate and/or configure a minimum communication range (MCR) for distance-based feedback in SCI (e.g., second-stage SCI), and a receiving UE may use the MCR to make decisions on whether to transmit NACK feedback. In some aspects, an MCR may indicate a minimum distance condition for operation (e.g., a QoS operating condition). The transmitting UE may indicate different MCRs for different applications and/or data flows. To illustrate, the transmitting UE may indicate a first MCR for data that is associated with a first application that has ultra-low latency and/or very high reliability operating conditions (e.g., QoS operating conditions), and a second MCR for data that is associated with a second application that does not have the same ultra-low latency and/or very high reliability operating conditions. Accordingly, an MCR may be application dependent and/or may vary for different data packets.

In some aspects, the transmitting UE may indicate the MCR using multiple transmissions. For instance, the transmitting UE may indicate a range of possible values for the MCR in a first transmission and indicate an index into the range of possible values in a second transmission to indicate selection of a particular MCR from the range. As one non-limiting example, the transmitting UE may indicate the following range of values in a first transmission: {20, 50, 80, 100, 120, 150, 180, 200, 220, 250, 270, 300, 350, 370, 400, 420, 450, 480, 500, 550, 600, 700, 1000}, where each value has a unit of meters. To indicate a particular value within the range, the transmitting UE may indicate an index, such as an index of 11 (e.g., in a zero-based indexing scheme) to select and/or configure MCR=300. Based at least in part on receiving an indication of the MCR, the receiving UE may compute a distance between the transmission UE and the receiving UE, and selectively transmit HARQ feedback (e.g., NACK feedback) based at least in part on the distance satisfying the MCR.

In some aspects, the receiving UE may calculate a distance between the receiving UE and a transmitting UE using a zone ID. To illustrate, the example 700 includes a first coverage area 702 and a second coverage area 704 that have been partitioned into multiple zones. For visual clarity, the first coverage area 702 and the second coverage area 704 are shown by FIG. 7 as having a same shape (e.g., a square shape) and a same size as one another, but in other examples, coverage areas may have varying sizes and/or shapes from one another. Each coverage area may be divided into multiple sub-coverage areas, sub-partitions, and/or zones. For example, the first coverage area 702 includes a first zone 706-1, a second zone 706-2, up an n-th zone **706-*n*, and the second coverage area 704 includes a first zone 708-1, a second zone 708-2, up to an m-th zone 708-*m*, where n and m are integers. In the example 700, n=m, and each zone has a same size and same shape (e.g., a square), but in other examples, coverage areas may be divided into a different number of zones from one another, the zones may have varying shapes, and/or the zones may have varying sizes. That is, the number of zones within the first coverage area 702 may differ from the number zones within the second coverage area 704, the zones within the first coverage area 702 may differ in size and/or shape from one another, and/or the zones within the first coverage area 702 may differ in size and/or shape from the zones within the second coverage area 704**.

In some aspects, a coverage area and/or zones within a coverage area may be preconfigured. To illustrate, a network node and/or a UE may broadcast a zone configuration of a coverage area, and the zone configuration may indicate any combination of a number of zones included in the coverage area, a respective size of each zone in the coverage area, a respective shape of each zone in the coverage area, and/or a respective ID of each zone in the coverage area. As one example, a zone may be preconfigured with a shape of a square, and each square may be configured from one of multiple options, such as one of multiple side length options (e.g., 5 meters, 10 meters, 20 meters, 30 meters, 40 meters, and/or 50 meters). To indicate a size of each zone, the network node and/or a UE may broadcast and/or transmit a first index that maps to an entry in a set of multiple size options (e.g., the side length options). Alternatively, or additionally, the network node and/or the UE may broadcast and/or transmit a second index that maps to an entry in a set of multiple shape options to indicate a shape of a zone. In some aspects, a respective zone ID of a zone may be based at least in part on geographical longitude/latitude (GLL) information. For instance, GLL information of a center location of a zone may be used to generate the zone ID, such as by using the 12 least significant bits (LSBs) of the center location GLL as the zone ID.

A UE may indicate its operating location based at least in part on indicating the respective ID of a zone in which the UE is operating. For example, a first transmitting UE of a HARQ process may be located in zone 710 of the first coverage area 702, and the first transmitting UE may indicate a zone ID that is assigned to the zone 710 to a receiving UE of the HARQ process that is located in zone 712 of the first coverage area 702. As one example, the first transmitting UE may calculate and/or determine an operating location and, subsequently a respective zone ID of the operating location, using UE GLL information and/or zone configuration information. To illustrate, the first transmitting UE may obtain the UE GLL information using a GNSS. Based at least in part on obtaining a zone ID of an operating location, the transmitting UE may indicate the zone ID in first stage SCI and/or second stage SCI. For instance, and as described above, the zone ID of a zone may be based at least in part on the GLL, and the first transmitting UE may indicate the zone ID based at least in part on transmitting the 12 LSB of the sampled and/or calculated operating location (e.g., the UE GLL) of the first transmitting UE. In some aspects, different coverage areas may use a same zone ID. For example, the receiving UE may maintain a first link with the first transmitting UE that is located in the zone 710 of the first coverage area 702 and/or the receiving UE may maintain a second link with a second transmitting UE that is located in zone 714 of the second coverage area 704. In some aspects, the zone 710 in the first coverage area 702 may have a same zone ID as a zone 714 in the second coverage area 704.

Based at least in part on receiving a zone ID that indicates a location of the transmitting UE, a receiving UE may calculate a distance between the transmitting UE and the receiving UE. For instance, the receiving UE may identify a first location of the transmitting UE using the zone ID and/or may obtain a second location of the receiving UE (e.g., via a UE GLL and/or GNSS), and may calculate the distance using the first location and the second location. As described above, the receiving UE may selectively transmit a NACK to the transmitting UE based at least in part on the distance satisfying, or failing to satisfy, a threshold.

As described above, "resource collision" may denote multiple devices accessing and/or using a same air interface resource at a same time, resulting in a receiving UE in a retransmission feedback process observing one or more errors in a sidelink transmission that has been altered based at least in part on a resource collision. The occurrence of resource collisions may proportionally increase as a number of UEs operating in a same coverage area increases. To illustrate, more UEs operating in the same coverage area may attempt to transmit in a same sidelink air interface resource. Accordingly, under high congestion (e.g., more than four UEs), resource collisions may be more likely to occur relative to low congestion (e.g., four or less UEs). Increased resource collisions may also result in an increased number of NACKs being transmitted by receiving UE(s) and/or an increased number of retransmissions being transmitted by transmitting UE(s). The increased number of NACKs and/or increased number of retransmissions may result in more sidelink air interface resources being used and, consequently, an increased likelihood of more resource collisions. In some aspects, enabling distance-based feedback, and the conditional transmission of NACKs, may reduce the number of NACKs and/or retransmissions in the wireless network to mitigate the potential increase of resource collisions.

A transmitting UE may use different MCSs for different transmissions based at least in part on channel conditions and/or channel quality. To illustrate, a resource pool and/or a resource allocation size for sidelink Mode 2 communications may be predetermined and/or preconfigured based at least in part on SPS. A data packet size may vary depending on an amount of data a transmitting UE may have stored in a buffer. Based at least in part on the resource pool and/or the resource allocation size being preconfigured, the transmitting UE may use a higher MCS for larger data packets to increase an amount of data encoded in a transmission and may use a lower MCS for smaller data packets to increase a reliability of data recovery. While the use of a higher MCS may enable a transmitting device to encode more data in a transmission, the higher MCS may result in the transmission being more sensitive to attenuation and fading in a communication channel (e.g., may incur more recovery errors) relative to a second transmission that uses a lower MCS. Under normal operating conditions (e.g., low congestion), a receiving UE may be able recover from packet reception failures of the higher MCS transmission based at least in part on the feedback and/or retransmission process. However, under high congestion operating conditions, the number of retransmissions may be reduced based at least in part on enabling distance-based feedback and the conditional transmission of NACKs as described above. Reducing the number of retransmissions may result in data packet failure without recovery, reduced data throughput, and/or increased data transfer latency.

Some techniques and apparatuses described herein provide configuring retransmissions based on sidelink congestion. In some aspects, a first UE may communicate with a second UE using a sidelink and a retransmission feedback process (e.g., a HARQ process), and the first UE may be a transmitting UE in the retransmission feedback process. In some aspects, the first UE may derive that a sidelink congestion metric satisfies a saturation threshold, such as by analyzing one or more communications carried by the sidelink. Based at least in part on the sidelink congestion metric satisfying the saturation threshold, the first UE may modify the retransmission feedback process. As one example, the first UE may update a feedback distance and transmit an indication of the updated feedback distance to the second UE. Alternatively, or additionally, the first UE may selectively retransmit a communication to the second UE. As one example, the first UE may calculate signal strength of a NACK feedback transmission (e.g., from the second UE), and may selectively retransmit the communication based at least in part on the signal strength.

In some aspects, a second UE may communicate with a first UE using a sidelink and a retransmission feedback process, and the second UE may be a receiving UE in the retransmission feedback process. The second UE may derive that a sidelink congestion metric satisfies a saturation threshold, and may modify the retransmission feedback process based at least in part on the sidelink congestion metric satisfying the saturation threshold. As one example, the second UE may calculate a signal strength of a communication from the UE, and may request a retransmission based at least in part on the signal strength satisfying a power threshold and/or the sidelink congestion metric satisfying the saturation threshold. As a second example, the second UE may not request the retransmission based at least in part on the signal strength failing to satisfy the power threshold and/or the sidelink congestion metric satisfying the saturation threshold.

A receiving UE and/or a transmitting UE may modify a retransmission process based at least in part on a sidelink congestion metric indicating that data traffic is operating at a high congestion level. For example, the transmitting UE may modify a feedback distance based at least in part on an MCS that is used to communicate with the receiving UE, such as by increasing the feedback distance proportionally with an increase in the MCS. Increasing the feedback distance proportionally with an increase in the MCS may result in the receiving UE requesting more retransmissions, the receiving UE receiving more retransmissions, resulting in the mitigation of data packet failures.

Alternatively, or additionally, a receiving UE may selectively request a retransmission based at least in part on a power threshold as described below to determine when to transmit the retransmission request and/or when not to transmit the retransmission request. In some aspects, the power threshold may be variable such that the power threshold increases as the MCS decreases and/or decreases the MCS increases. Using a power threshold that inversely increases and decreases with the MCS in a high congestion environment may result in the receiving UE requesting more retransmissions for a first communication that uses a first MCS that is higher than a second MCS that is used for a second communication, resulting in the receiving UE requesting more retransmissions for higher MCSs that are more susceptible to data packet failures and, consequently, the mitigation of data packet failures in a high congestion environment.

As indicated above, FIG. 7 is provided as an example. Other examples may differ from what is described with regard to FIG. 7.

Figure 8:
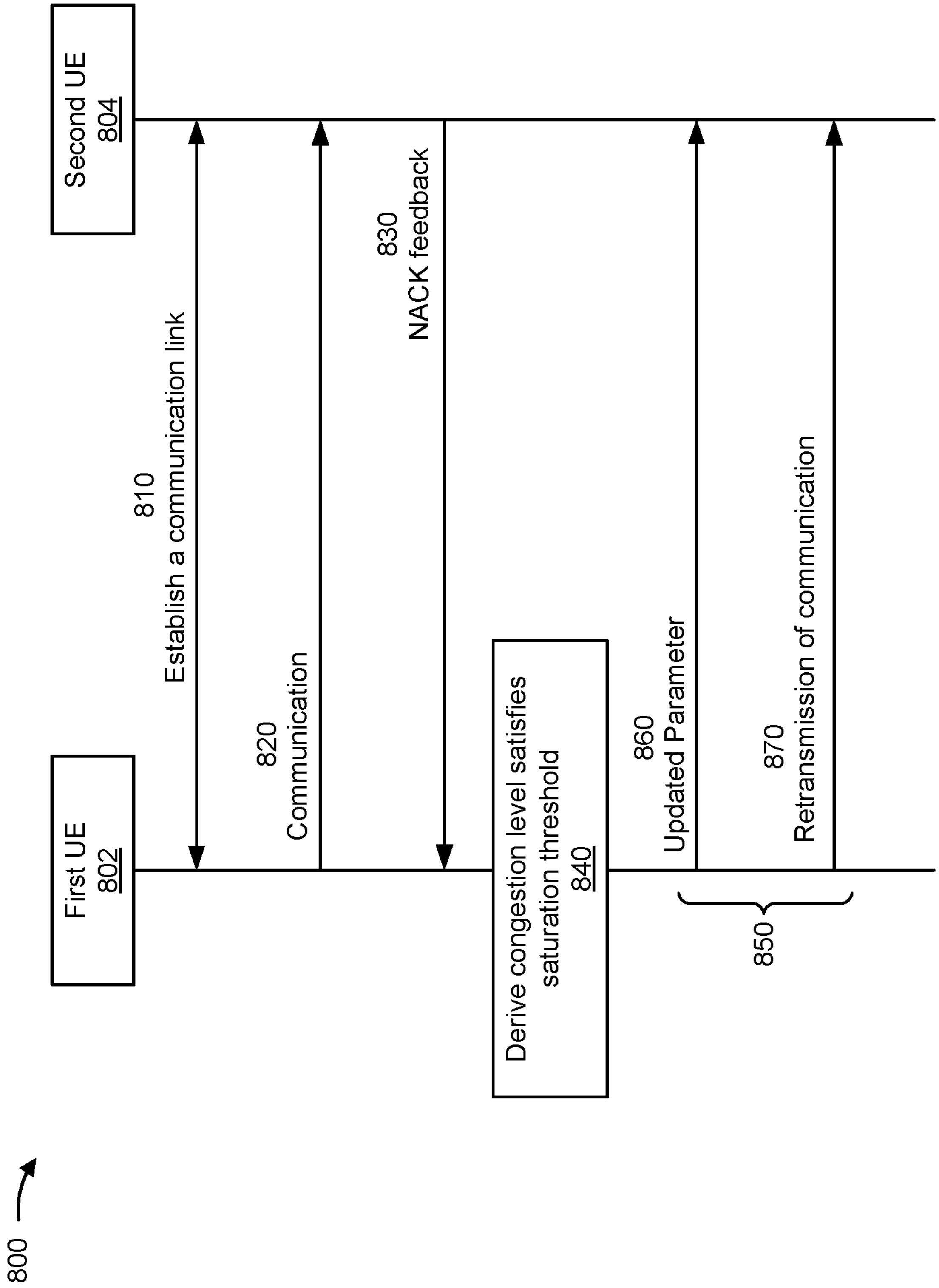
FIG. 8 is a diagram illustrating an example of a wireless communication process between a first UE and a second UE, in accordance with the present disclosure.

FIG. 8 is a diagram illustrating an example 800 of a wireless communication process between a first UE 802 (e.g., a first UE 120) and a second UE 804 (e.g., a second UE 120), in accordance with the present disclosure. In some aspects, the example 800 describes a wireless communication process that includes a transmitting UE (e.g., the first UE 802) of a retransmission feedback process selectively altering a retransmission feedback process and/or one or more parameters used in the retransmission feedback process.

As shown by reference number 810, a first UE 802 and a second UE 804 may establish a connection. To illustrate, the first UE 802 and the second UE 804 may establish, as the connection, a sidelink as described with regard to FIG. 4 and FIG. 5. Alternatively, or additionally, the first UE 802 and the second UE 804 may communicate via the connection based at least in part on any combination of Layer 1 signaling (e.g., SCI), Layer 2 signaling (e.g., a MAC control element (CE)), and/or Layer 3 signaling (e.g., RRC signaling). To illustrate, the first UE 802 may request, via RRC signaling, UE capability information, and the second UE 804 may transmit, via RRC signaling, the UE capability information (or vice versa). Alternatively, or additionally, the first UE 802 and/or the second UE 804 may autonomously transmit the UE capability (e.g., without receiving a request for the UE capability information). As part of communicating via the connection, the first UE 802 and/or the second UE 804 may transmit configuration information via Layer 3 signaling (e.g., RRC signaling), and activate and/or deactivate a particular configuration via Layer 2 signaling (e.g., a MAC CE) and/or Layer 1 signaling (e.g., SCI). To illustrate, the first UE 802 may transmit the configuration information via Layer 3 signaling at a first point in time associated with the second UE 804 being tolerant of communication delays, and the first UE 802 may transmit an activation of the configuration via Layer 2 signaling and/or Layer 1 signaling at a second point in time associated with the second UE 804 being intolerant to communication delays.

As shown by reference number 820, the first UE 802 may transmit, and the second UE 804 may receive, a communication. In some aspects, the first UE 802 may communicate with the second UE 804 using a retransmission feedback process. To illustrate, the communication may be associated with a HARQ process, the first UE 802 may be a transmitting UE in the HARQ process, and the second UE 804 may be a receiving UE in the HARQ process. In some aspects, the first UE 802 may transmit the communication as a unicast communication and/or unicast transmission (e.g., that is directed to only the second UE 804). Alternatively, or additionally, the first UE may transmit the communication as a groupcast communication and/or groupcast transmission (e.g., that is directed to a group of UEs that includes the second UE 804).

As shown by reference number 830, the second UE 804 may transmit, and the first UE 802 may receive, feedback. To illustrate, and as shown by FIG. 8, the second UE 804 may transmit HARQ feedback that is shown by FIG. 8 as a NACK feedback. For a groupcast communication, the second UE 804 may be configured to provide feedback using a first groupcast feedback mode (e.g., option 1 groupcast feedback) in which the second UE 804 only transmits NACK feedback. Alternatively, or additionally, the second UE 804 may be configured to provide the feedback using a second feedback mode (e.g., option 2 groupcast feedback) in which the second UE 804 transmits ACK feedback and/or NACK feedback. For a unicast communication, the second UE 804 may transmit ACK feedback and/or NACK feedback. In some aspects, the second UE 804 may selectively transmit the feedback based at least in part on a distance threshold as described with regard to FIG. 7. To illustrate, the second UE 804 may receive location information associated with the first UE 802 based at least in part on receiving the communication as part of a groupcast message. The second UE 804 may use the location information to calculate a distance between the second UE 804 and the first UE 802. In some aspects, the second UE 804 may selectively transmit the NACK feedback based at least in part on the distance satisfying a distance threshold as described with regard to FIG. 7.

As shown by reference number 840, the first UE 802 may derive that a congestion level of network traffic satisfies a saturation threshold. For instance, the first UE 802 may analyze one or more sidelink communications to calculate a sidelink congestion metric that indicates a congestion level of sidelink traffic (e.g., a sidelink congestion level). As one example, the first UE 802 may generate a packet loss metric (e.g., a number of packet losses), a packet delay metric, a throughput metric, a signal quality metric (e.g., signal power level), and/or a resource allocation metric (e.g., successful resource acquisition and/or unsuccessful resource acquisition), or any combination thereof. To determine a congestion level, the first UE 802 may compare the sidelink congestion metric to a threshold. As one example, the first UE 802 may use a saturation threshold that indicates that network traffic is congested and/or that the network traffic is not congested. For clarity, the first UE 802 derives the congestion level after receiving the feedback in the example 800, but in other examples, the first UE 802 may derive that the congestion level satisfies the saturation threshold at one or more other points in time during the wireless communication process, such as prior to receiving the feedback, after establishing the communication link, and/or iteratively.

As shown by reference number 850, the first UE 802 may modify the retransmission feedback process based at least in part on the sidelink congestion metric satisfying the saturation threshold. Alternatively, or additionally, the first UE 802 may modify the retransmission feedback process based at least in part receiving NACK feedback from the second UE 804. As one example of modifying the retransmission feedback process, and as shown by reference number 860, the first UE 802 may transmit, and the second UE 804 may receive, an indication of an updated parameter, such as an updated feedback distance that is used by the second UE 804 to determine whether or not to transmit NACK feedback as described with regard to FIG. 7. For example, prior to deriving that the sidelink congestion metric satisfies the saturation threshold, the first UE 802 may indicate a first feedback distance to the second UE 804, and the first feedback distance may be based at least in part on a sidelink congestion level being low (e.g., the sidelink congestion metric does not satisfy the saturation threshold). In some aspects, the use of a feedback distance in a retransmission feedback process may only be applied to communications that indicate location information, such as a groupcast communication. Accordingly, the first UE 802 may modify the retransmission feedback process by transmitting an indication of an updated feedback distance to the second UE 804. That is, the first UE 802 may transmit a second feedback distance that is based at least in part on the sidelink congestion level being high (e.g., the sidelink congestion metric satisfies the saturation threshold) to update the distance threshold at the second UE 804.

In some aspects, the first UE 802 may select and/or update the feedback distance (e.g., a distance threshold used by the second UE 804) based at least in part on an MCS used for the communicating with the second UE 804. For example, the first UE 802 may increase the feedback distance for a higher MCS (e.g., an MCS value that satisfies a high MCS threshold). By increasing the feedback distance in operating conditions that include a high sidelink congestion level, the first UE 802 may configure the retransmission feedback process at the second UE 804 and increase a number of retransmission requests (e.g., NACK feedback) transmitted by the second UE 804 to mitigate packet failures at the second UE 804. Accordingly, the first UE 802 may select and/or update the feedback distance using a feedback distance scale that increases and decreases with the MCS.

The first UE 802 may select the feedback distance based at least in part on a feedback distance table that includes multiple potential feedback distances, and each potential feedback distance may be mapped to any combination of an MCS, a constant bit rate, and/or a priority. To illustrate, the first UE 802 may select a potential feedback distance and/or value from the feedback distance table using an MCS that is used to generate a transmission and/or communication to the second UE 804, a constant bit rate (e.g., a desired constant bit rate and/or an achieved constant bit rate) that is used to generate the transmission and/or communication, and/or a priority of the transmission and/or communication. In some aspects, the feedback distance table may be preconfigured (e.g., received from a network node 110) and/or may be specified by a communication standard. The first UE 802 may use the potential feedback distance and/or value selected from the feedback distance table as the updated feedback distance. Alternatively, or additionally, the first UE 802 may use the potential feedback distance and/or the value to calculate the updated feedback distance.

In some aspects, the first UE 802 may select the feedback distance based at least in part on an MCR. For instance, based at least in part on a congestion level satisfying a saturation threshold, the first UE 802 may select the potential feedback distance from the feedback distance table as described above, and the first UE 802 may compare the potential feedback distance to the MCR. To calculate and/or derive an updated feedback distance, the first UE 802 may select a minimum distance from the potential feedback distance and the MCR, and the first UE 802 may modify, update, and/or set the feedback distance to a lesser of the potential feedback distance and the MCR. Accordingly, the first UE 802 may modify a feedback distance based at least in part on a sidelink congestion level satisfying a saturation congestion level, and the modification to the feedback distance may increase the feedback distance for higher MCSs and mitigate packet failure at a receiving UE (e.g., the second UE 804).

Alternatively, as another example of modifying the retransmission feedback process, and as shown by reference number 870, the first UE 802 may selectively retransmit, and the second UE 804 may receive, the communication. While FIG. 8 shows the first UE 802 retransmitting the communication, other examples may include the first UE 802 not retransmitting the communication.

As one example of selectively retransmitting a communication, the first UE 802 may receive a NACK feedback transmission as shown by reference number 840. In some aspects, the first UE 802 may generate and/or calculate a signal strength metric of the NACK feedback transmission, such as an RSRP metric and/or an RSSI metric. In some aspects, the first UE 802 may compare the signal strength metric to a power threshold. The first UE 802 may retransmit the communication based at least in part on the signal strength metric satisfying the power threshold and/or may refrain from retransmitting the communication based at least in part on the signal strength metric failing to satisfy the power threshold.

In some aspects, the power threshold may be variable based at least in part on any combination of an MCS that is used for transmissions and/or communications to the second UE 804, a constant bit rate (e.g., a desired constant bit rate and/or an achieved constant bit rate) associated with the transmission and/or communication, and/or a priority of the transmission and/or communication. In a similar manner as the feedback distance described above, the first UE 802 may select the power threshold using the MCS, the constant bit rate, and/or the priority. To illustrate, the first UE 802 may select the power threshold from a power threshold table that includes multiple potential power thresholds, and each potential power thresholds may be mapped in the power threshold table to any combination of an MCS, a constant bit rate, and/or a priority. In some aspects, the power threshold table may be based at least in part on a power threshold scale that inversely increases and decreases with the MCS. That is, the power threshold scale may increase a value of the power threshold as the MCS decreases and/or may decrease the value of the power threshold as the MCS increases.

As described above, the first UE 802 may transmit the communication described with regard to reference number 820 as a groupcast transmission to a group of UEs. In some aspects, the first UE 802 may selectively retransmit the communication based at least in part on receiving at least one NACK from at least one UE in the group of UEs. Alternatively, or additionally, the first UE 802 may selectively retransmit the communication based at least in part on a signal strength metric associated with the at least one NACK satisfying the power threshold and/or a congestion level satisfying a saturation threshold. That is, the first UE 802 may calculate a signal strength metric based at least in part on a NACK feedback transmission from at least one UE in the group of UEs, and/or may selectively retransmit the communication without receiving a respective NACK from each UE in the group of UEs. Accordingly, the NACK feedback described with regard to reference number 840 may be a NACK feedback transmission from a UE in a group of UEs associated with a groupcast message.

Alternatively, or additionally, and based at least in part on the congestion level metric satisfying the saturation threshold, the first UE 802 may generate a signal strength metric using a NACK feedback transmission that is associated with a unicast communication to the second UE 804. In some aspects, the unicast communication and/or the NACK feedback transmission may not include location information (e.g., of the first UE 802 and/or the second UE 804, respectively). Accordingly, the first UE 802 may selectively retransmit a communication (e.g., a unicast communication and/or groupcast communication) based at least in part on using the signal strength metric and without using location information.

In some aspects the first UE 802 may modify the retransmission feedback process based at least in part on receiving a configuration update. To illustrate, the first UE 802 may receive the configuration update via an access link. As one example, the first UE 802 may be implemented as a V2X device, and the V2X device may establish the access link with a network node 110 (an aggregated based station and/or a disaggregated base station), a road side unit (RSU), and/or a peer wireless communication device (e.g., a peer V2X device). Alternatively, or additionally, the first UE 802 may receive the configuration update via a sidelink, such as the sidelink established with the second UE 804 and/or another sidelink established with a third UE. Accordingly, the first UE 802 may modify and/or reconfigure the retransmission feedback process using the configuration update from the network node 110. Example parameters included in the configuration update may include one or more of a power threshold update, a feedback distance update, a saturation threshold update, a feedback distance table update, and/or a power threshold table update. In some aspects, the first UE 802 may receive the configuration update in Layer 1 signaling, Layer 2 signaling, and/or Layer 3 signaling, such as in SCI, a MAC CE, and/or an RRC message. In other aspects, the first UE 802 may receive the configuration update in an application layer of a protocol stack.

A transmitting UE (e.g., the first UE 802) may use a sidelink congestion metric to identify that sidelink traffic has reached a saturation level, and the transmitting UE (e.g., the first UE 802) may modify a retransmission process based at least in part identifying that the sidelink traffic has reached the saturation level. As one example, the transmitting UE (e.g., the first UE 802) may modify a feedback distance that is used by a receiving UE (e.g., the second UE 804) to selectively request retransmissions. To illustrate, the transmitting UE (e.g., the first UE 802) may modify the feedback distance by increasing a number of retransmission requests proportionally with an increase in the MCS to increase retransmission requests from the receiving UE (e.g., the second UE 804) and mitigate data packet failures. As a second example, the transmitting UE (e.g., the first UE 802) may selectively retransmit a communication based at least in part on a power threshold that inversely increases and/or decreases with an MCS, resulting in the transmitting UE (e.g., the first UE 802) retransmitting more communications with higher MCSs (e.g., relative to communications with lower MCSs) to mitigate data packet failures in operating environments with high sidelink congestion.

As indicated above, FIG. 8 is provided as an example. Other examples may differ from what is described with regard to FIG. 8.

Figure 9:
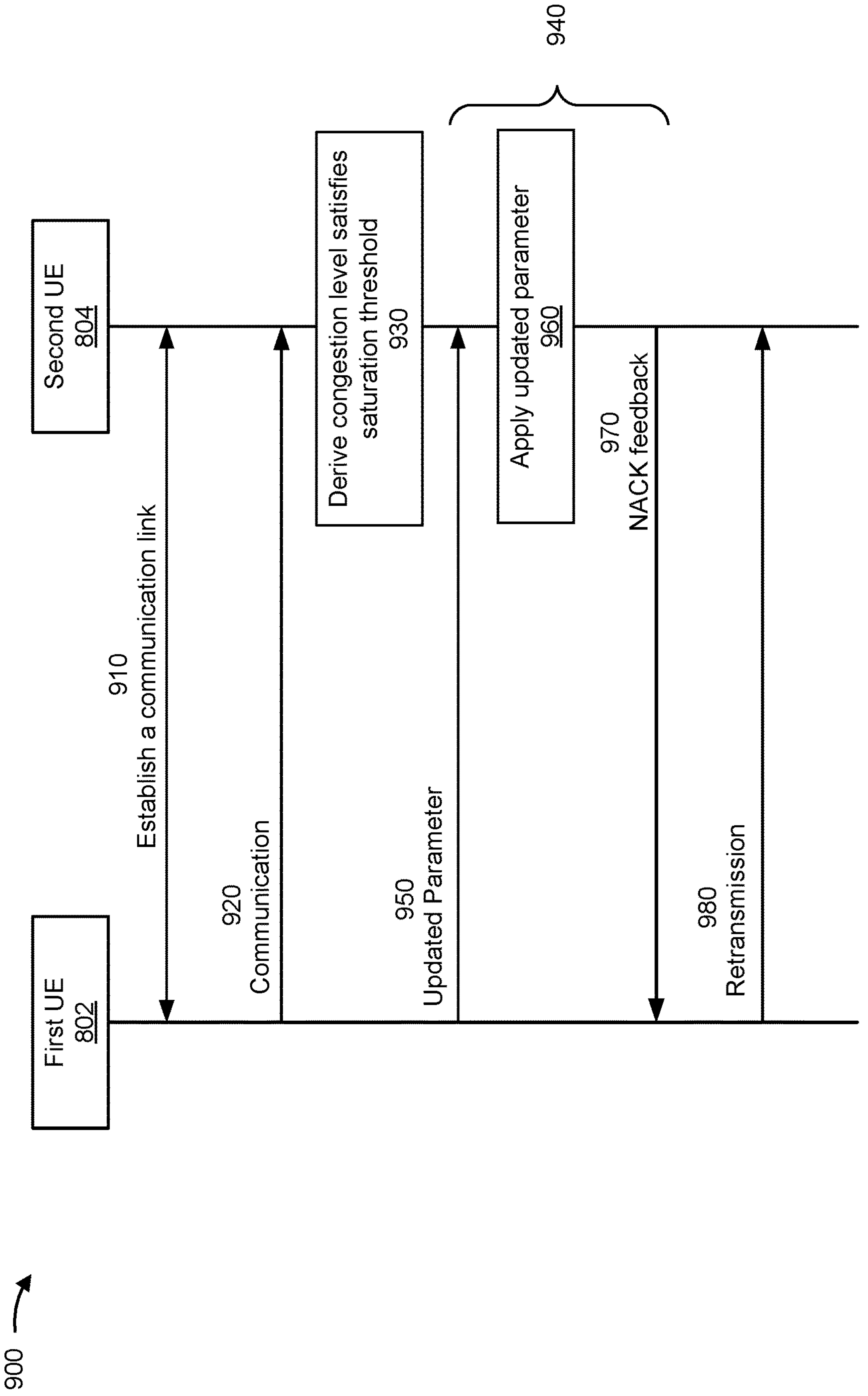
FIG. 9 is a diagram illustrating an example of a wireless communication process between the first UE and the second UE as described with regard to FIG. 8, in accordance with the present disclosure.

FIG. 9 is a diagram illustrating an example 900 of a wireless communication process between the first UE 802 and the second UE 804 as described with regard to FIG. 8, in accordance with the present disclosure. In some aspects, the example 900 describes a wireless communication process that includes a receiving UE (e.g., the second UE 804) of a retransmission feedback process selectively modifying the retransmission feedback process, and the modifications may be configured to mitigate data packet failures in an operating environment with high data traffic congestion. Aspects described with respect to the example 900 may be used in combination with aspects described with respect to the example 800.

As shown by reference number 910, the first UE 802 and the second UE 804 may establish a connection as described with regard to reference number 810 of FIG. 8. As shown by reference number 920, the first UE 802 may transmit, and the second UE 804 may receive, a communication as described with regard to reference number 820 of FIG. 8. In some aspects, the first UE 802 may communicate with the second UE 804 using a retransmission feedback process, the first UE 802 may be a transmitting UE in the HARQ process, and the second UE 804 may be a receiving UE in the HARQ process.

As shown by reference number 930, the second UE 804 may derive that a congestion level (e.g., a sidelink congestion level) satisfies a saturation threshold. In some aspects, the second UE 804 may derive that the congestion level (e.g., the sidelink congestion level) satisfies the saturation threshold in a similar manner as described with regard to reference number 840 of FIG. 8 and the first UE 802. For instance, the second UE 804 may analyze one or more sidelink communications and/or calculate one or more sidelink congestion metrics as described above. For clarity, the second UE 804 may derive the congestion level prior to receiving an updated parameter and/or selectively transmitting NACK feedback (as shown in example 900 of FIG. 9), but in other examples, the second UE 804 may derive that the congestion level satisfies the saturation threshold at one or more other points in time during the wireless communication process, such as after receiving the updated parameter, after transmitting the feedback, after establishing the communication link, and/or iteratively.

As shown by reference number 940, the second UE 804 may modify the retransmission feedback process based at least in part on the sidelink congestion metric satisfying the saturation threshold. As one example of modifying the retransmission feedback process, and as shown by reference number 950, the second UE 804 may receive, an indication of an updated parameter from the first UE 802 as described with regard to reference number 860 of FIG. 8. Based at least in part on the sidelink congestion metric satisfying the saturation threshold, and as shown by reference number 960, the second UE 804 may apply the updated parameter to the retransmission process.

In some aspects, the second UE 804 may modify and/or adapt a total number of retransmissions and/or an actual number of retransmissions that are requested by the second UE 804 as part of the retransmission feedback process. For instance, the second UE 804 may increase the number of requested retransmissions based at least in part on the sidelink congestion metric satisfying the saturation threshold and/or a received transmission failing a signal-to-interference-plus-noise ratio (SINR) decoding condition. Increasing the total number of retransmissions in such condition(s) may enable the second UE 804 to satisfy a packet reception performance condition (e.g., a QoS condition) by increasing the number of requested retransmissions and/or increasing the number of received retransmissions to mitigate data packet failure. Alternatively, or additionally, the second UE 804 may reduce the number of retransmissions based at least in part on the sidelink congestion metric returning to a level that fails to satisfy the saturation threshold.

Alternatively, or additionally, as part of modifying the retransmission feedback process and as shown by reference number 970, the second UE 804 may selectively transmit, and the first UE 802 may receive, NACK feedback. That is, the second UE 804 may selectively request a retransmission of a communication from the first UE 802. While the second UE 804 transmits the NACK feedback in the example 900, other examples may include the second UE 804 not transmitting the NACK feedback and/or the request for the retransmission.

As one example, the second UE 804 may calculate a signal strength metric of the communication from the first UE 802. In some aspects, the second UE 804 may compare the signal strength metric to a power threshold, and selectively transmit the NACK feedback and/or a request for a retransmission based at least in part on whether the signal strength metric satisfies the power threshold. For instance, the second UE 804 may transmit the request and/or the NACK feedback based at least in part on the signal strength metric satisfying a power threshold and/or may refrain from transmitting (e.g., does not transmit) the request and/or the NACK feedback based at least in part on the signal strength metric failing to satisfy the power threshold. In a similar manner as described with regard to FIG. 8, the power threshold may be variable and/or based at least in part on an MCS, a priority, and/or a channel busy ratio. Alternatively, or additionally, the power threshold may be based at least in part on a power threshold scale that inversely increases and decreases with the MCS. That is, the power threshold scale may increase a value of the power threshold as the MCS decreases and/or may decrease the value of the power threshold as the MCS increases. Thus, the power threshold scale may result in a receiving UE requesting fewer retransmissions for a first communication that uses a first MCS relative to a second communication that uses a second MCS that is higher than the first MCS. In some aspects, the second UE 804 may select the power threshold from a power threshold table in a similar manner as described above.

The communication may include a PSSCH demodulation DMRS and/or a PSCCH DMRS, and the second UE 804 may calculate the signal strength metric using the PSSCH DMRS and/or the PSCCH DMRS. As one example, the second UE 804 may calculate an RSRP metric using the PSSCH DMRS and/or the PSCCH DMRS.

Alternatively, or additionally, the communication may be a groupcast communication, and the second UE 804 may calculate a distance between the first UE 802 and the second UE 804 using location information included in the groupcast communication. In some aspects, the second UE 804 may selectively request a retransmission and/or selectively transmit NACK feedback based at least in part on the distance and/or a distance threshold. To illustrate, the second UE 804 may transmit the request and/or the NACK feedback based at least in part on the distance satisfying a distance threshold and/or may refrain from requesting the retransmission (and/or may not transmit the NACK feedback) based at least in part on the distance failing to satisfy the distance threshold. The distance threshold may be based at least in part on a feedback distance as described above, and the feedback distance may be based at least in part on an MCS, a feedback distance scale that increases and decreases with the MCS, a constant bit rate, and/or a priority. The second UE 804 may receive an indication of the feedback distance from the first UE 802 and/or may select the feedback distance from a feedback distance table.

As shown by reference number 980, the first UE 802 may retransmit, and the second UE 804 may receive, the communication. In some aspects, the first UE 802 may selectively retransmit the communication as described with regard to FIG. 8. While the first UE 802 retransmits the communication in the example 900, other examples may include the first UE 802 not retransmitting the communication.

In some aspects the second UE 804 may modify the retransmission feedback process based at least in part on receiving a configuration update. To illustrate, the second UE 804 may receive the configuration update via an access link. As one example, the second UE 804 may be implemented as a V2X device, and the V2X device may establish the access link with a network node 110 (an aggregated based station and/or a disaggregated base station), an RSU, and/or a peer wireless communication device (e.g., another V2X device and/or a peer V2X device). Alternatively, or additionally, the second UE 804 may receive the configuration update via a sidelink, such as the sidelink established with the first UE 802 and/or another sidelink established with a third UE. Accordingly, in some aspects, the second UE 804 may modify and/or reconfigure the retransmission feedback process using the configuration update from the network node 110. Example parameters included in the configuration update may include one or more of a power threshold update, a feedback distance update, a saturation threshold update, a feedback distance table update, and/or a power threshold table update. In some aspects, the second UE 804 may receive the configuration update in Layer 1 signaling, Layer 2 signaling, and/or Layer 3 signaling, examples of which are provided above. In other aspects, the second UE 804 may receive the configuration update in an application layer of a protocol stack.

A receiving UE (e.g., the second UE 804) may use a sidelink congestion metric to identify that sidelink traffic has reached a saturation level, and the receiving UE (e.g., the second UE 804) may modify a retransmission process based at least in part identifying that the sidelink traffic has reached the saturation level. As one example, the receiving UE (e.g., the second UE 804) may selectively request a retransmission as described above based at least in part on a feedback distance, a distance threshold, and/or a power threshold. In some aspects, the receiving UE (e.g., the second UE 804) may request more retransmissions in an operating condition that includes high data traffic congestion to mitigate data packet failures and/or to satisfy QoS operating conditions.

As indicated above, FIG. 9 is provided as an example. Other examples may differ from what is described with regard to FIG. 9.

Figure 10:
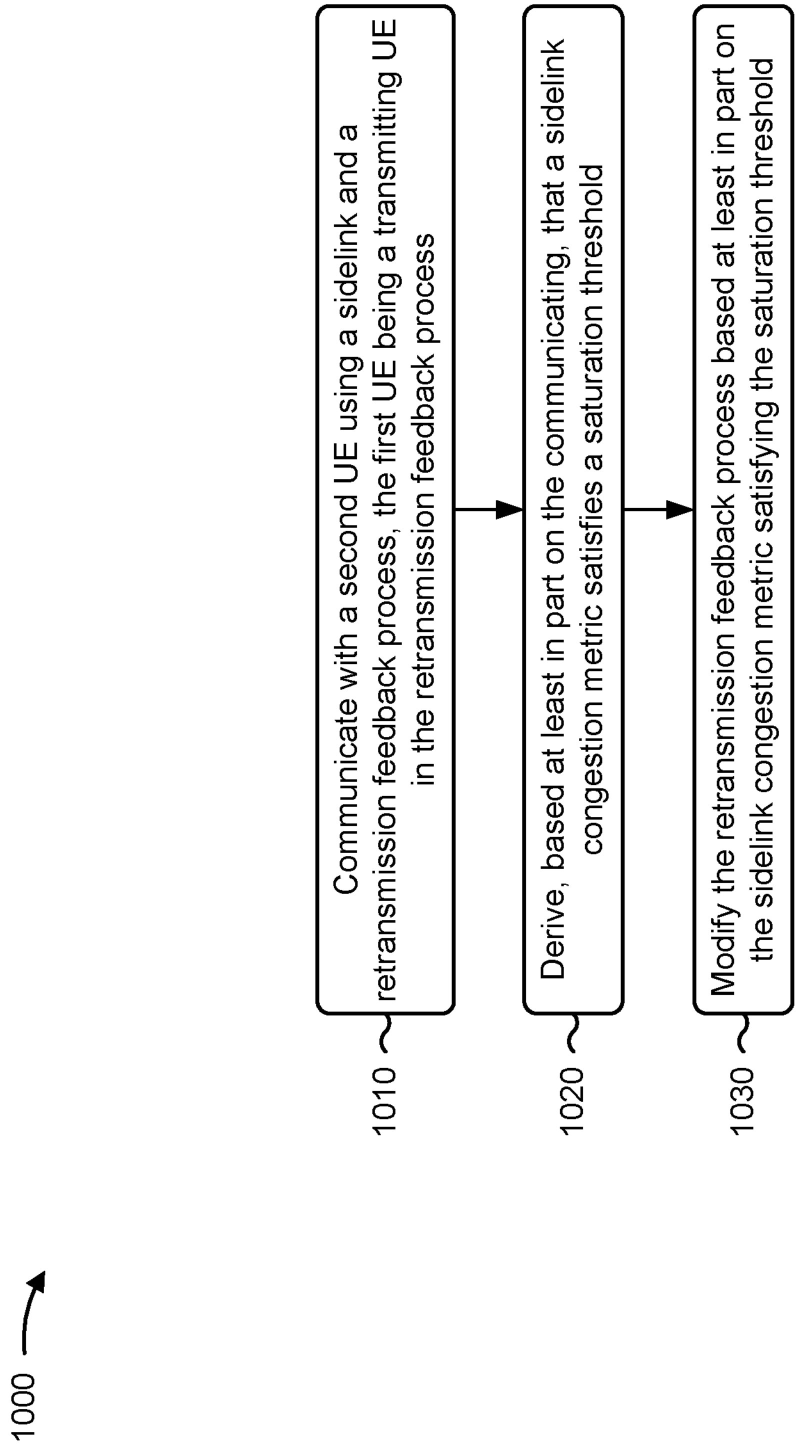
FIG. 10 is a diagram illustrating an example process performed, for example, at a UE or an apparatus of a UE, in accordance with the present disclosure.

FIG. 10 is a diagram illustrating an example process 1000 performed, for example, at a UE or an apparatus of a UE, in accordance with the present disclosure. Example process 1000 is an example where the apparatus or the UE (e.g., UE 120) performs operations associated with configuring retransmissions based on sidelink congestion.

In some aspects, the UE is a first UE, and as shown in FIG. 10, in some aspects, process 1000 may include communicating with a second UE using a sidelink and a retransmission feedback process, the first UE being a transmitting UE in the retransmission feedback process (block 1010). For example, the first UE (e.g., using reception component 1202, transmission component 1204, and/or communication manager 1206, depicted in FIG. 12) may communicate with a second UE using a sidelink and a retransmission feedback process, the first UE being a transmitting UE in the retransmission feedback process, as described above.

As further shown in FIG. 10, in some aspects, process 1000 may include deriving, based at least in part on the communicating, that a sidelink congestion metric satisfies a saturation threshold (block 1020). For example, the first UE (e.g., using communication manager 1206, depicted in FIG. 12) may derive, based at least in part on the communicating, that a sidelink congestion metric satisfies a saturation threshold, as described above.

As further shown in FIG. 10, in some aspects, process 1000 may include modifying the retransmission feedback process based at least in part on the sidelink congestion metric satisfying the saturation threshold (block 1030). For example, the first UE (e.g., using communication manager 1206, depicted in FIG. 12) may modify the retransmission feedback process based at least in part on the sidelink congestion metric satisfying the saturation threshold, as described above.

Process 1000 may include additional aspects, such as any single aspect or any combination of aspects described below and/or in connection with one or more other processes described elsewhere herein.

In a first aspect, modifying the retransmission feedback process includes updating a feedback distance, and transmitting an indication of the updated feedback distance to the second UE.

In a second aspect, updating the feedback distance includes updating the feedback distance based at least in part on an MCS used for the communicating with the second UE.

In a third aspect, updating the feedback distance includes updating the feedback distance using a feedback distance scale that increases and decreases with the MCS.

In a fourth aspect, updating the feedback distance includes selecting the feedback distance based at least in part on a feedback distance table that includes multiple potential feedback distances, the feedback distance table mapping each potential feedback distance of the multiple potential feedback distances to one or more of an MCS, a constant bit rate, or a priority.

In a fifth aspect, process 1000 includes selecting a potential feedback distance from the feedback distance table based at least in part on the MCS, and updating the feedback distance includes setting the feedback distance to a lesser of the potential feedback distance and a minimum communication distance.

In a sixth aspect, process 1000 includes receiving a NACK feedback transmission that is associated with a communication, calculating a signal strength metric of the NACK feedback transmission, and retransmitting, to the second UE, the communication selectively and based at least in part on the signal strength metric.

In a seventh aspect, retransmitting the communication selectively includes retransmitting the communication based at least in part on the signal strength metric satisfying a power threshold.

In an eighth aspect, retransmitting the communication selectively includes refraining from retransmitting the communication based at least in part on the signal strength metric failing to satisfy a power threshold.

In a ninth aspect, process 1000 includes selecting a power threshold based at least in part on a power threshold table that maps at least one of an MCS, a constant bit rate, or a priority, to a respective potential power threshold, and comparing the signal strength metric to the power threshold, and retransmitting the communication selectively includes retransmitting the communication selectively based at least in part on the comparing.

In a tenth aspect, the communication includes a groupcast communication to a group of UEs, and retransmitting the communication selectively and based at least in part on the signal strength metric includes retransmitting the communication based at least in part on receiving the NACK from at least one UE in the group of UEs.

In an eleventh aspect, process 1000 includes receiving a configuration update for the retransmission feedback process, and reconfiguring the retransmission feedback process based at least in part on the configuration update.

In a twelfth aspect, the configuration update includes at least one of a power threshold update, a feedback distance update, a saturation threshold update, a feedback distance table update, or a power threshold table update.

In a thirteenth aspect, receiving the configuration update includes receiving the configuration update via an access link.

In a fourteenth aspect, receiving the configuration update includes receiving the configuration update via the sidelink.

In a fifteenth aspect, receiving the configuration update includes receiving the configuration update in an application layer.

In a sixteenth aspect, receiving the configuration update includes receiving the configuration update in a radio resource control message.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
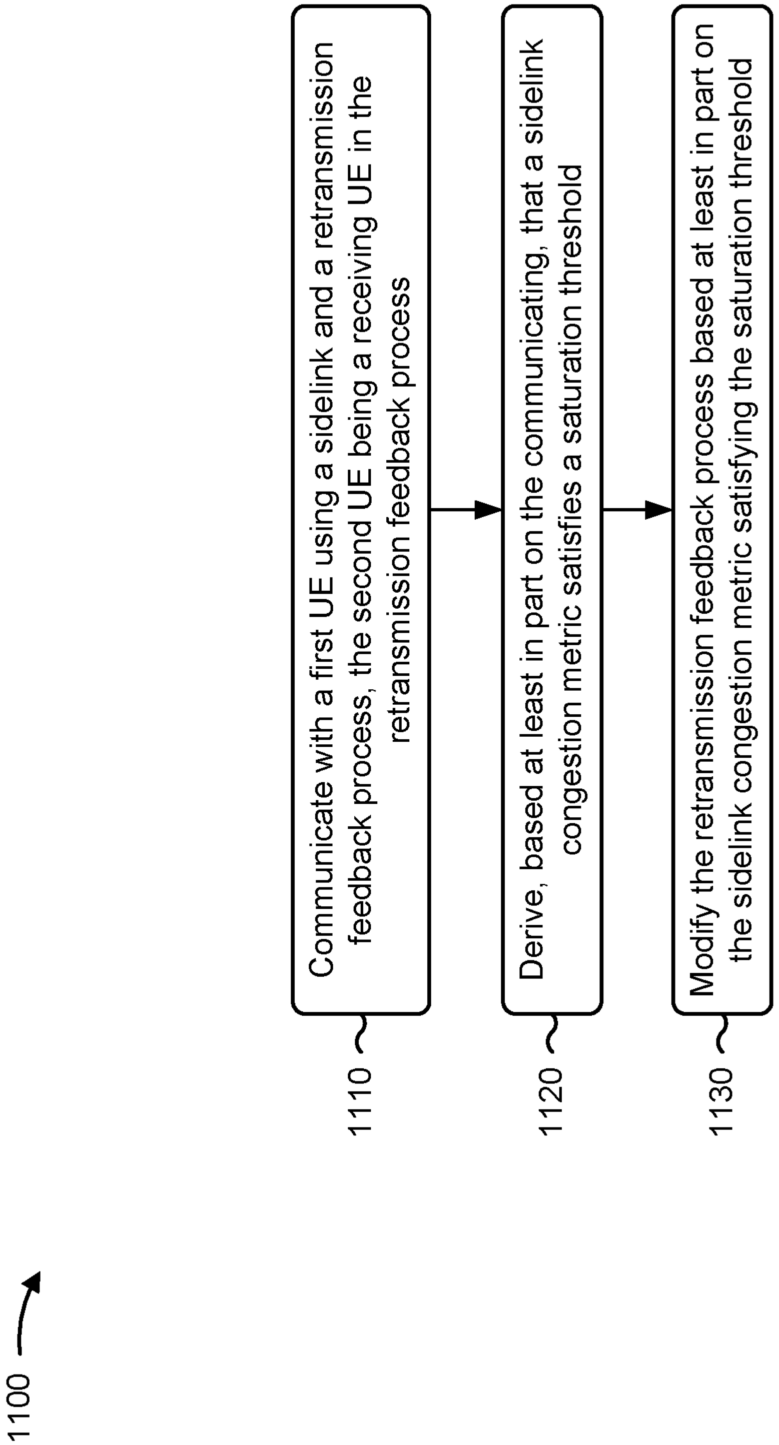
FIG. 11 is a diagram illustrating an example process performed, for example, at a UE or an apparatus of a UE, in accordance with the present disclosure.

FIG. 11 is a diagram illustrating an example process 1100 performed, for example, at a UE or an apparatus of a UE, in accordance with the present disclosure. Example process 1100 is an example where the apparatus or the UE (e.g., UE 120) performs operations associated with configuring retransmissions based on sidelink congestion.

In some aspects, the UE is a second UE, and as shown in FIG. 11, in some aspects, process 1100 may include communicating with a first UE using a sidelink and a retransmission feedback process, the second UE being a receiving UE in the retransmission feedback process (block 1110). For example, the second UE (e.g., using reception component 1202, transmission component 1204, and/or communication manager 1206, depicted in FIG. 12) may communicate with a first UE using a sidelink and a retransmission feedback process, as described above.

As further shown in FIG. 11, in some aspects, process 1100 may include deriving, based at least in part on the communicating, that a sidelink congestion metric satisfies a saturation threshold (block 1120). For example, the second UE (e.g., using communication manager 1206, depicted in FIG. 12) may derive, based at least in part on the communicating, that a sidelink congestion metric satisfies a saturation threshold, as described above.

As further shown in FIG. 11, in some aspects, process 1100 may include modifying the retransmission feedback process based at least in part on the sidelink congestion metric satisfying the saturation threshold (block 1130). For example, the second UE (e.g., using communication manager 1206, depicted in FIG. 12) may modify the retransmission feedback process based at least in part on the sidelink congestion metric satisfying the saturation threshold, as described above.

Process 1100 may include additional aspects, such as any single aspect or any combination of aspects described below and/or in connection with one or more other processes described elsewhere herein.

In a first aspect, process 1100 includes receiving a feedback distance that is based at least in part on the sidelink congestion metric satisfying the saturation threshold, and modifying the retransmission feedback process includes updating the retransmission feedback process with the feedback distance.

In a second aspect, process 1100 includes requesting, from the first UE, a retransmission of a communication from the first UE selectively and based at least in part on the feedback distance.

In a third aspect, requesting the retransmission selectively includes requesting the retransmission based at least in part on a distance between the first UE and the second UE satisfying a distance threshold that is based at least in part on the feedback distance.

In a fourth aspect, requesting the retransmission selectively includes refraining from requesting the retransmission based at least in part on a distance between the first UE and the second UE failing to satisfy a distance threshold that is based at least in part on the feedback distance.

In a fifth aspect, the feedback distance is based at least in part on at least one of an MCS, a feedback distance scale that increases and decreases with the MCS, a constant bit rate, or a priority.

In a sixth aspect, modifying the retransmission feedback process includes modifying a total number of requested retransmissions based at least in part on at least one of a congestion level that is indicated by the sidelink congestion metric, or an SINR decoding condition.

In a seventh aspect, process 1100 includes receiving a communication from the first UE, calculating a signal strength metric of the communication, and requesting, from the first UE, a retransmission of the communication selectively and based at least in part on the signal strength metric.

In an eighth aspect, requesting the retransmission selectively includes transmitting a request for the retransmission based at least in part on the signal strength metric satisfying a power threshold.

In a ninth aspect, the power threshold is based at least in part on at least one of an MCS, a priority, a channel busy ratio, or a power threshold scale that inversely increases and decreases with the MCS.

In a tenth aspect, requesting the retransmission selectively includes refraining from transmitting a request for the retransmission based at least in part on the signal strength metric failing to satisfy a power threshold.

In an eleventh aspect, the communication includes at least one of a PSSCH DMRS, or a PSCCH DMRS.

In a twelfth aspect, the signal strength metric includes an RSRP metric.

In a thirteenth aspect, process 1100 includes receiving a configuration update for the retransmission feedback process, and reconfiguring the retransmission feedback process based at least in part on the configuration update.

In a fourteenth aspect, the configuration update includes at least one of a power threshold update, a feedback distance update, or a saturation threshold update.

In a fifteenth aspect, receiving the configuration update includes receiving the configuration update via an access link.

In a sixteenth aspect, receiving the configuration update includes receiving the configuration update via the sidelink.

In a seventeenth aspect, receiving the configuration update includes receiving the configuration update in an application layer.

In an eighteenth aspect, receiving the configuration update includes receiving the configuration update in a radio resource control message.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
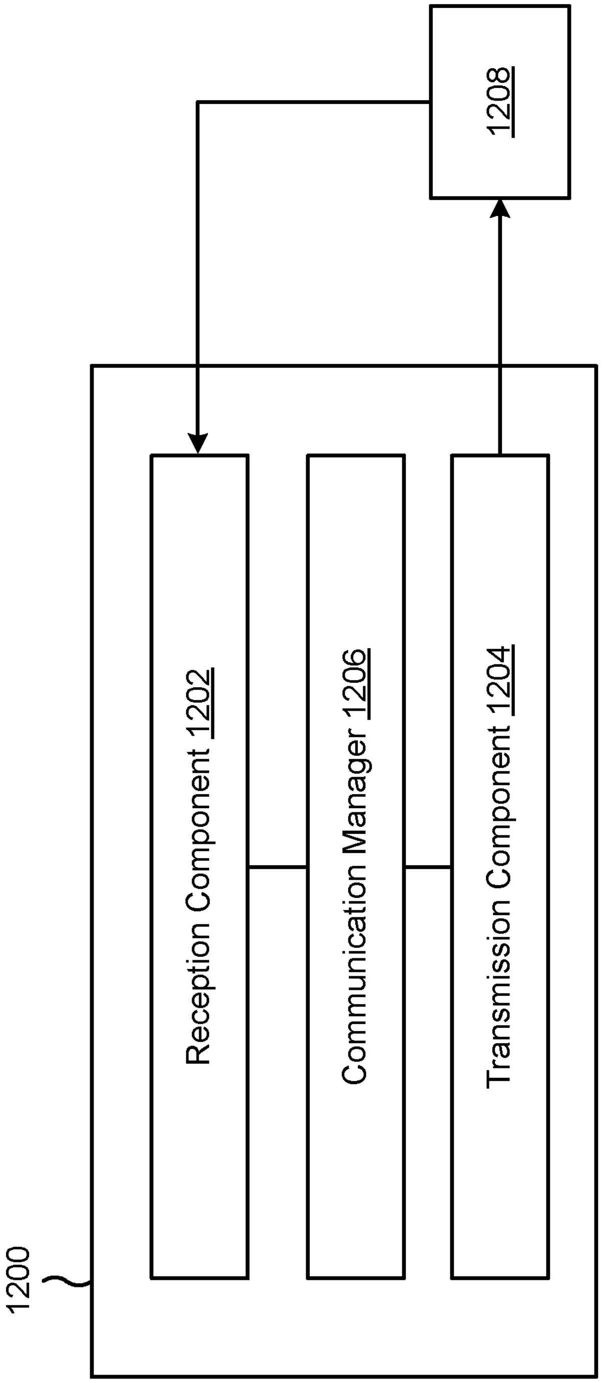
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 7-9. Additionally, or alternatively, the apparatus 1200 may be configured to perform one or more processes described herein, such as process 1000 of FIG. 10, process 1100 of FIG. 11, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1204 may be co-located with the reception component 1202 in one or more transceivers.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

Based at least in part on a UE acting as a transmitting UE and/or a first UE in a retransmission feedback process, the reception component 1202 and/or the transmission component 1204 may communicate with a second UE using a sidelink and a retransmission feedback process. The communication manager 1206 may derive, based at least in part on the communicating, that a sidelink congestion metric satisfies a saturation threshold. The communication manager 1206 may modify the retransmission feedback process based at least in part on the sidelink congestion metric satisfying the saturation threshold.

In some aspects, the communication manager 1206 may select a potential feedback distance from a feedback distance table based at least in part on the MCS. Alternatively, or additionally, the reception component 1202 may receive a NACK feedback transmission that is associated with a communication. In some aspects, the communication manager 1206 may calculate a signal strength metric of the NACK feedback transmission.

In some aspects, the transmission component 1204 may retransmit, to a second UE, the communication selectively and based at least in part on the signal strength metric. Alternatively, or additionally, and based at least in part on the UE acting as a transmitting UE, the reception component 1202 may receive a configuration update for the retransmission feedback process. In some aspects, the communication manager 1206 may reconfigure the retransmission feedback process based at least in part on the configuration update.

Based at least in part on the UE acting as a receiving UE and/or a second UE in a retransmission feedback process, the reception component 1202 and/or the transmission component 1204 may communicate with a first UE using a sidelink and a retransmission feedback process. The communication manager 1206 may derive, based at least in part on the communicating, that a sidelink congestion metric satisfies a saturation threshold. The communication manager 1206 may modify the retransmission feedback process based at least in part on the sidelink congestion metric satisfying the saturation threshold.

Alternatively, or additionally, the reception component 1202 may receive a feedback distance that is based at least in part on the sidelink congestion metric satisfying the saturation threshold. In some aspects, the communication manager 1206 may request, from the first UE, a retransmission of a communication from the first UE selectively and based at least in part on the feedback distance.

The reception component 1202 may receive a communication from the first UE. In some aspects, the communication manager 1206 may calculate a signal strength metric of the communication. Alternatively, or additionally, the communication manager 1206 may request, from the first UE, a retransmission of the communication selectively and based at least in part on the signal strength metric.

In some aspects, and based at least in part on the UE acting as a receiving UE, the reception component 1202 may receive a configuration update for the retransmission feedback process. In some aspects, the communication manager 1206 may reconfigure the retransmission feedback process based at least in part on the configuration update.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a first user equipment (UE), comprising: communicating with a second UE using a sidelink and a retransmission feedback process, the first UE being a transmitting UE in the retransmission feedback process; deriving, based at least in part on the communicating, that a sidelink congestion metric satisfies a saturation threshold; and modifying the retransmission feedback process based at least in part on the sidelink congestion metric satisfying the saturation threshold.

Aspect 2: The method of Aspect 1, wherein modifying the retransmission feedback process comprises: updating a feedback distance; and transmitting an indication of the updated feedback distance to the second UE.

Aspect 3: The method of Aspect 2, wherein updating the feedback distance comprises: updating the feedback distance based at least in part on a modulation and coding scheme (MCS) used for the communicating with the second UE.

Aspect 4: The method of Aspect 3, wherein updating the feedback distance further comprises: updating the feedback distance using a feedback distance scale that increases and decreases with the MCS.

Aspect 5: The method of Aspect 3, wherein updating the feedback distance further comprises: selecting the feedback distance based at least in part on a feedback distance table that includes multiple potential feedback distances, the feedback distance table mapping each potential feedback distance of the multiple potential feedback distances to one or more of: an MCS, a constant bit rate, or a priority.

Aspect 6: The method of Aspect 5, further comprising: selecting a potential feedback distance from the feedback distance table based at least in part on the MCS, wherein updating the feedback distance further comprises: setting the feedback distance to a lesser of the potential feedback distance and a minimum communication distance, wherein updating the feedback distance further comprises: setting the feedback distance to a lesser of the potential feedback distance and a minimum communication distance.

Aspect 7: The method of any of Aspects 1-6, further comprising: receiving a negative acknowledgement (NACK) feedback transmission that is associated with a communication; calculating a signal strength metric of the NACK feedback transmission; and retransmitting, to the second UE, the communication selectively and based at least in part on the signal strength metric.

Aspect 8: The method of Aspect 7, wherein retransmitting the communication selectively comprises: retransmitting the communication based at least in part on the signal strength metric satisfying a power threshold.

Aspect 9: The method of Aspect 7, wherein retransmitting the communication selectively comprises: refraining from retransmitting the communication based at least in part on the signal strength metric failing to satisfy a power threshold.

Aspect 10: The method of Aspect 7, further comprising: selecting a power threshold based at least in part on a power threshold table that maps at least one of: a modulation and coding scheme (MCS), a constant bit rate, or a priority, to a respective potential power threshold; and comparing the signal strength metric to the power threshold, wherein retransmitting the communication selectively comprises: retransmitting the communication selectively based at least in part on the comparing.

Aspect 11: The method of Aspect 7, wherein the communication comprises a groupcast communication to a group of UEs, and wherein retransmitting the communication selectively and based at least in part on the signal strength metric comprises: retransmitting the communication based at least in part on receiving the NACK from at least one UE in the group of UEs.

Aspect 12: The method of any of Aspects 1-11, further comprising: receiving a configuration update for the retransmission feedback process; and reconfiguring the retransmission feedback process based at least in part on the configuration update.

Aspect 13: The method of Aspect 12, wherein the configuration update comprises at least one of: a power threshold update, a feedback distance update, a saturation threshold update, a feedback distance table update, or a power threshold table update.

Aspect 14: The method of Aspect 12, wherein receiving the configuration update comprises: receiving the configuration update via an access link.

Aspect 15: The method of Aspect 12, wherein receiving the configuration update comprises: receiving the configuration update via the sidelink.

Aspect 16: The method of Aspect 12, wherein receiving the configuration update comprises: receiving the configuration update in an application layer.

Aspect 17: The method of Aspect 12, wherein receiving the configuration update comprises: receiving the configuration update in a radio resource control message.

Aspect 18: A method of wireless communication performed by a second user equipment (UE), comprising: communicating with a first UE using a sidelink and a retransmission feedback process, the second UE being a receiving UE in the retransmission feedback process; deriving, based at least in part on the communicating, that a sidelink congestion metric satisfies a saturation threshold; and modifying the retransmission feedback process based at least in part on the sidelink congestion metric satisfying the saturation threshold.

Aspect 19: The method of Aspect 18, further comprising: receiving a feedback distance that is based at least in part on the sidelink congestion metric satisfying the saturation threshold, wherein modifying the retransmission feedback process comprises: updating the retransmission feedback process with the feedback distance, wherein modifying the retransmission feedback process comprises: updating the retransmission feedback process with the feedback distance.

Aspect 20: The method of Aspect 19, further comprising: requesting, from the first UE, a retransmission of a communication from the first UE selectively and based at least in part on the feedback distance.

Aspect 21: The method of Aspect 20, wherein requesting the retransmission selectively comprises: requesting the retransmission based at least in part on a distance between the first UE and the second UE satisfying a distance threshold that is based at least in part on the feedback distance.

Aspect 22: The method of Aspect 20, wherein requesting the retransmission selectively comprises: refraining from requesting the retransmission based at least in part on a distance between the first UE and the second UE failing to satisfy a distance threshold that is based at least in part on the feedback distance.

Aspect 23: The method of Aspect 19, wherein the feedback distance is based at least in part on at least one of: a modulation and coding scheme (MCS), a feedback distance scale that increases and decreases with the MCS, a constant bit rate, or a priority.

Aspect 24: The method of any of Aspects 18-23, wherein modifying the retransmission feedback process comprises: modifying a total number of requested retransmissions based at least in part on at least one of: a congestion level that is indicated by the sidelink congestion metric, or a signal-to-interference-plus-noise ratio (SINR) decoding condition.

Aspect 25: The method of any of Aspects 18-24, further comprising: receiving a communication from the first UE; calculating a signal strength metric of the communication; and requesting, from the first UE, a retransmission of the communication selectively and based at least in part on the signal strength metric.

Aspect 26: The method of Aspect 25, wherein requesting the retransmission selectively comprises: transmitting a request for the retransmission based at least in part on the signal strength metric satisfying a power threshold.

Aspect 27: The method of Aspect 26, wherein the power threshold is based at least in part on at least one of: a modulation and coding scheme (MCS), a priority, a channel busy ratio, or a power threshold scale that inversely increases and decreases with the MCS.

Aspect 28: The method of Aspect 25, wherein requesting the retransmission selectively comprises: refraining from transmitting a request for the retransmission based at least in part on the signal strength metric failing to satisfy a power threshold.

Aspect 29: The method of Aspect 25, wherein the communication comprises at least one of: a physical sidelink shared channel (PSSCH) demodulation reference signal (DMRS), or a physical sidelink control channel (PSCCH) DMRS.

Aspect 30: The method of Aspect 25, wherein the signal strength metric comprises a reference signal received power (RSRP) metric.

Aspect 31: The method of any of Aspects 18-30, further comprising: receiving a configuration update for the retransmission feedback process; and reconfiguring the retransmission feedback process based at least in part on the configuration update.

Aspect 32: The method of Aspect 31, wherein the configuration update comprises at least one of: a power threshold update, a feedback distance update, or a saturation threshold update.

Aspect 33: The method of Aspect 31, wherein receiving the configuration update comprises: receiving the configuration update via an access link.

Aspect 34: The method of Aspect 31, wherein receiving the configuration update comprises: receiving the configuration update via the sidelink.

Aspect 35: The method of Aspect 31, wherein receiving the configuration update comprises: receiving the configuration update in an application layer.

Aspect 36: The method of Aspect 31, wherein receiving the configuration update comprises: receiving the configuration update in a radio resource control message.

Aspect 37: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-17.

Aspect 38: An apparatus for wireless communication at a device, the apparatus comprising one or more memories and one or more processors coupled to the one or more memories, the one or more processors configured to cause the device to perform the method of one or more of Aspects 1-17.

Aspect 39: An apparatus for wireless communication, the apparatus comprising at least one means for performing the method of one or more of Aspects 1-17.

Aspect 40: A non-transitory computer-readable medium storing code for wireless communication, the code comprising instructions executable by one or more processors to perform the method of one or more of Aspects 1-17.

Aspect 41: A non-transitory computer-readable medium storing a set of instructions for wireless communication, the set of instructions comprising one or more instructions that, when executed by one or more processors of a device, cause the device to perform the method of one or more of Aspects 1-17.

Aspect 42: A device for wireless communication, the device comprising a processing system that includes one or more processors and one or more memories coupled with the one or more processors, the processing system configured to cause the device to perform the method of one or more of Aspects 1-17.

Aspect 43: An apparatus for wireless communication at a device, the apparatus comprising one or more memories and one or more processors coupled to the one or more memories, the one or more processors individually or collectively configured to cause the device to perform the method of one or more of Aspects 1-17.

Aspect 44: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 18-36.

Aspect 45: An apparatus for wireless communication at a device, the apparatus comprising one or more memories and one or more processors coupled to the one or more memories, the one or more processors configured to cause the device to perform the method of one or more of Aspects 18-36.

Aspect 46: An apparatus for wireless communication, the apparatus comprising at least one means for performing the method of one or more of Aspects 18-36.

Aspect 47: A non-transitory computer-readable medium storing code for wireless communication, the code comprising instructions executable by one or more processors to perform the method of one or more of Aspects 18-36.

Aspect 48: A non-transitory computer-readable medium storing a set of instructions for wireless communication, the set of instructions comprising one or more instructions that, when executed by one or more processors of a device, cause the device to perform the method of one or more of Aspects 18-36.

Aspect 49: A device for wireless communication, the device comprising a processing system that includes one or more processors and one or more memories coupled with the one or more processors, the processing system configured to cause the device to perform the method of one or more of Aspects 18-36.

Aspect 50: An apparatus for wireless communication at a device, the apparatus comprising one or more memories and one or more processors coupled to the one or more memories, the one or more processors individually or collectively configured to cause the device to perform the method of one or more of Aspects 18-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having"

A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A first user equipment (UE), comprising:
- one or more antennas; and
- a processing system that includes one or more processors and one or more memories that store code for the one or more processors, the processing system configured to cause the first UE to:
  - communicate with a second UE using a sidelink and a retransmission feedback process, the first UE being a transmitting UE in the retransmission feedback process;
  - transmit an indication of a feedback distance;
  - derive that a sidelink congestion metric satisfies a saturation threshold; and
  - modify the retransmission feedback process based at least in part on the sidelink congestion metric satisfying the saturation threshold,
    - wherein, to modify the retransmission feedback process, the processing system is configured to cause the first UE to:
      - update the feedback distance; and
      - transmit an indication of the updated feedback distance to the second UE.

2. The first UE of claim 1, wherein the processing system, to cause the first UE to update the feedback distance, is configured to cause the first UE to:
- update the feedback distance based at least in part on a modulation and coding scheme (MCS) used to communicate with the second UE.

3. The first UE of claim 2, wherein the processing system, to cause the first UE to update the feedback distance, is configured to cause the first UE to:
- update the feedback distance using a feedback distance scale that increases and decreases with the MCS.

4. The first UE of claim 2, wherein the processing system, to cause the first UE to update the feedback distance, is configured to cause the first UE to:
- select the feedback distance based at least in part on a feedback distance table that includes multiple potential feedback distances, the feedback distance table mapping each potential feedback distance of the multiple potential feedback distances to one or more of:
  - an MCS,
  - a constant bit rate, or
  - a priority.

5. The first UE of claim 1, wherein the processing system is further configured to cause the UE to:
- receive a negative acknowledgement (NACK) feedback transmission that is associated with a communication;
- calculate a signal strength metric of the NACK feedback transmission; and
- retransmit, to the second UE, the communication selectively and based at least in part on the signal strength metric.

6. The first UE of claim 1, wherein the processing system is further configured to cause the first UE to:
- receive a configuration update for the retransmission feedback process; and
- reconfigure the retransmission feedback process based at least in part on the configuration update.

7. A second user equipment (UE), comprising:
- one or more antennas; and
- a processing system that includes one or more processors and one or more memories that store code for the one or more processors, the processing system configured to cause the second UE to:
  - communicate with a first UE using a sidelink and a retransmission feedback process, the second UE being a receiving UE in the retransmission feedback process;
  - receive an indication of a feedback distance;
  - derive that a sidelink congestion metric satisfies a saturation threshold;
  - receive an updated feedback distance based at least in part on the sidelink congestion metric satisfying the saturation threshold; and
  - modify the retransmission feedback process based at least in part on the sidelink congestion metric satisfying the saturation threshold,
    - wherein, to modify the retransmission feedback process, the processing system is configured to cause the second UE to:
      - update the retransmission feedback process with the updated feedback distance.

8. The second UE of claim 7, wherein the processing system is further configured to cause the second UE to:
- request, from the first UE, a retransmission of a communication from the first UE selectively and based at least in part on the feedback distance.

9. The second UE of claim 7, wherein the feedback distance is based at least in part on at least one of:
- a modulation and coding scheme (MCS),
- a feedback distance scale that increases and decreases with the MCS,
- a constant bit rate, or
- a priority.

10. The second UE of claim 7, wherein the processing system, to cause the second UE to modify the retransmission feedback process, is configured to cause the second UE to:
- modify a total number of requested retransmissions based at least in part on at least one of:
  - a congestion level that is indicated by the sidelink congestion metric, or
  - a signal-to-interference-plus-noise ratio (SINR) decoding condition.

11. The second UE of claim 7, wherein the processing system is further configured to cause the second UE to:
- receive a communication from the first UE;
- calculate a signal strength metric of the communication; and
- request, from the first UE, a retransmission of the communication selectively and based at least in part on the signal strength metric.

12. The second UE of claim 7, wherein the processing system is further configured to cause the second UE to:
- receive a configuration update for the retransmission feedback process; and reconfigure the retransmission feedback process based at least in part on the configuration update.

13. A method of wireless communication performed by a first user equipment (UE), comprising:

communicating with a second UE using a sidelink and a retransmission feedback process transmitting an indication of a feedback distance;

deriving, based at least in part on the communicating, that a sidelink congestion metric satisfies a saturation threshold; and modifying the retransmission feedback process based at least in part on the sidelink congestion metric satisfying the saturation threshold, wherein modifying the retransmission feedback process comprises:

updating the feedback distance; and transmitting an indication of the updated feedback distance to the second UE.

14. The method of claim 13, wherein updating the feedback distance comprises:

updating the feedback distance based at least in part on a modulation and coding scheme (MCS) used for the communicating with the second UE.

15. The method of claim 14, wherein updating the feedback distance comprises using a feedback distance scale that increases and decreases with the MCS.

16. The method of claim 14, wherein updating the feedback distance comprises:

selecting the feedback distance based at least in part on a feedback distance table that includes multiple potential feedback distances, the feedback distance table mapping each potential feedback distance of the multiple potential feedback distances to one or more of:

an MCS, a constant bit rate, or a priority.

17. The method of claim 13, further comprising:

receiving a negative acknowledgement (NACK) feedback transmission that is associated with a communication;

calculating a signal strength metric of the NACK feedback transmission; and retransmitting, to the second UE, the communication selectively and based at least in part on the signal strength metric.

18. The method of claim 17, further comprising:

selecting a power threshold based at least in part on a power threshold table that maps at least one of:

a modulation and coding scheme (MCS), a constant bit rate, or a priority, to a respective potential power threshold; and comparing the signal strength metric to the power threshold, wherein retransmitting the communication selectively comprises:

retransmitting the communication selectively based at least in part on the comparing.

19. The method of claim 17, wherein the communication comprises a groupcast communication to a group of UEs, and wherein retransmitting the communication selectively and based at least in part on the signal strength metric comprises:

retransmitting the communication based at least in part on receiving the NACK from at least one UE in the group of UEs.

20. The method of claim 13, further comprising:

receiving a configuration update for the retransmission feedback process; and reconfiguring the retransmission feedback process based at least in part on the configuration update.

* * * * *